US008013272B2

(12) United States Patent
Hayashi

(10) Patent No.: US 8,013,272 B2
(45) Date of Patent: Sep. 6, 2011

(54) SHEET PROCESSING APPARATUS AND IMAGE FORMING APPARATUS

(75) Inventor: Kenichi Hayashi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 11/759,149

(22) Filed: Jun. 6, 2007

(65) Prior Publication Data

US 2007/0286658 A1 Dec. 13, 2007

(30) Foreign Application Priority Data

Jun. 7, 2006 (JP) ................................ 2006-159134
Apr. 17, 2007 (JP) ................................ 2007-108410

(51) Int. Cl.
*B23K 26/38* (2006.01)
*B65H 35/00* (2006.01)

(52) U.S. Cl. ................................ 219/121.67; 270/58.07

(58) Field of Classification Search ............. 219/121.67, 219/121.69, 121.72, 216, 121.61, 121.83; 700/166; 270/58.07
See application file for complete search history.

(56) References Cited

U.S. PATENT DOCUMENTS 3,882,770 A * 5/1975 Bleasdale ....................... 100/49
5,253,030 A * 10/1993 Shigemura et al. ........... 399/407
5,323,220 A * 6/1994 Yasuda ......................... 399/391
5,797,320 A * 8/1998 Buschulte et al. ............ 101/226
6,191,382 B1 * 2/2001 Damikolas ............... 219/121.67
6,290,220 B1 * 9/2001 Takehara et al. ........... 270/58.12
6,816,180 B1 * 11/2004 Paz-Pujalt et al. ............ 347/224
6,978,954 B2 * 12/2005 Kroger et al. .................. 241/36
7,246,961 B2 * 7/2007 Gilmour ....................... 400/621
7,296,791 B2 * 11/2007 Kurahashi et al. ............ 271/176
7,380,779 B2 * 6/2008 Nakamura et al. ......... 270/58.25
7,472,901 B2 * 1/2009 Nishimura et al. ........ 270/58.12
7,527,254 B2 * 5/2009 Tamura et al. ............ 270/58.07
2006/0118529 A1 * 6/2006 Aoki et al. ............... 219/121.67

FOREIGN PATENT DOCUMENTS

JP 61-1368852 A * 6/1986

* cited by examiner

*Primary Examiner* — Geoffrey S Evans
(74) *Attorney, Agent, or Firm* — Canon U.S.A., Inc., IP Division

(57) ABSTRACT

A sheet processing apparatus having a laser processing unit, a collecting portion, and a detecting portion. The collecting portion is disposed below a laser processing position of the laser processing unit. The collecting portion collects a scrap of the sheet produced when the sheet is processed by the laser processing unit. The detecting portion is configured to detect the scrap collected into the collecting portion and reaching a predetermined height. A detection position of the detecting portion is lower than a processing range of the laser beam where processing by the laser beam is possible.

10 Claims, 17 Drawing Sheets

SHEET PROCESSING APPARATUS AND IMAGE FORMING APPARATUS

BACKGROUND OF THE INVENTION

1. Field of the Invention

The present invention relates to a sheet processing apparatus and an image forming apparatus that processes a sheet on which an image is formed (hereinafter referred to as a "printed sheet") by a laser processing unit and, more specifically, relates to a sheet processing apparatus and an image forming apparatus that prevent collected scraps from being overheated by a laser beam.

2. Description of the Related Art

Some known image forming apparatuses, such as copy machines and printers, include sheet processing apparatuses that selectively carry out binding and punching on a printed sheet so as to reduce the trouble required for binding sheets after image formation.

There is a known sheet processing apparatus including a laser processing unit that is configured to cut a sheet in a desired shape by irradiating the sheet with a laser beam having a predetermined pulse (for example, refer to U.S. Pat. No. 5,797,320).

FIG. 16 illustrates the structure of a known sheet processing apparatus including the above-described laser processing unit. FIG. 16 illustrates a laser processing unit 7 including a laser generator 8, which generates a laser beam, and a lens 9.

The laser processing unit 7 focuses the laser beam generated at the laser generator 8 to a surface S of a sheet by the lens 9. In this way, power great enough to cut the sheet is obtained within a predetermined range of the laser beam (hereinafter referred to as a "processing range") from a point that is a predetermined distance forward of the focal point to a point a that is a predetermined distance rearward of the focal point in the transmission direction of the laser beam. By controlling the laser beam in accordance with the desired shape, a product having the desired shape can be obtained.

With a sheet processing apparatus including the laser processing unit 7, when a printed sheet is discharged from an image forming apparatus main body (not shown), the printed sheet enters an inlet 16 and is conveyed along a conveying path 10 by a pair of first conveying rollers 12.

Then, the printed sheet is conveyed by a pair of second conveying rollers 13 and a pair of third conveying roller 14. At this time, the printed sheet passes below the laser processing unit 7 disposed above the conveying path 10. While the printed sheet passes below the laser processing unit 7, a laser beam cuts the printed sheet (hereinafter this cutting process is referred to as "laser cutting"). Finally, the printed sheet is discharged into a stack tray 15 by the third conveying roller 14.

As shown in FIGS. 16 and 17, a scrap box 11 opposes the laser processing unit 7 with the conveying path 10 interposed therebetween. By disposing the scrap box 11 at this position, scraps produced as a result of laser cutting can be collected without affecting the delivery of the sheet.

With such a known sheet processing apparatus and image forming apparatus, when the scrap box 11, which is a collecting portion, is disposed at a position opposing the laser processing unit 7, the amount of scraps Pd collected in the scrap box 11 increases as the cutting process is continued.

As the amount of stored (collected) scraps Pd of sheets increases, the upper surface of the scraps Pd moves closer to the processing range of a laser beam, where cutting by the laser beam is possible. When the scraps Pd of sheets approaches the processing range of a laser beam, the scraps Pd may be overheated by a laser beam generated when cutting subsequent sheets to be processed.

SUMMARY OF THE INVENTION

The present invention is directed to a sheet processing apparatus configured to prevent a collected scrap from being overheated by a laser beam.

According to one aspect of the present invention, a sheet processing apparatus includes a laser processing unit configured to process a sheet by irradiating the sheet with a laser beam; a collecting portion provided below a laser processing position of the laser processing unit, the collecting portion being configured to collect a scrap of the sheet produced when the sheet is processed by the laser processing unit; and a detecting portion configured to detect the scrap of the sheet being accumulated in the collecting portion and reaching a predetermined height, wherein a detection position of the detecting portion is lower than a processing range of the laser beam, the processing range being a range where processing by the laser beam is possible.

In this way, by setting the detection position of the detecting portion that detects the scrap collected into the collecting portion at a predetermined height lower than the processing range of the laser beam when carried out laser processing, the scrap collected into the collecting portion can be prevented from being overheated by the laser beam.

Further features of the present invention will become apparent from the following description of exemplary embodiments (with reference to the attached drawings).

DESCRIPTION OF THE EMBODIMENTS

Embodiments of present invention will be described with reference to the drawings.

First Embodiment

Figure 1:
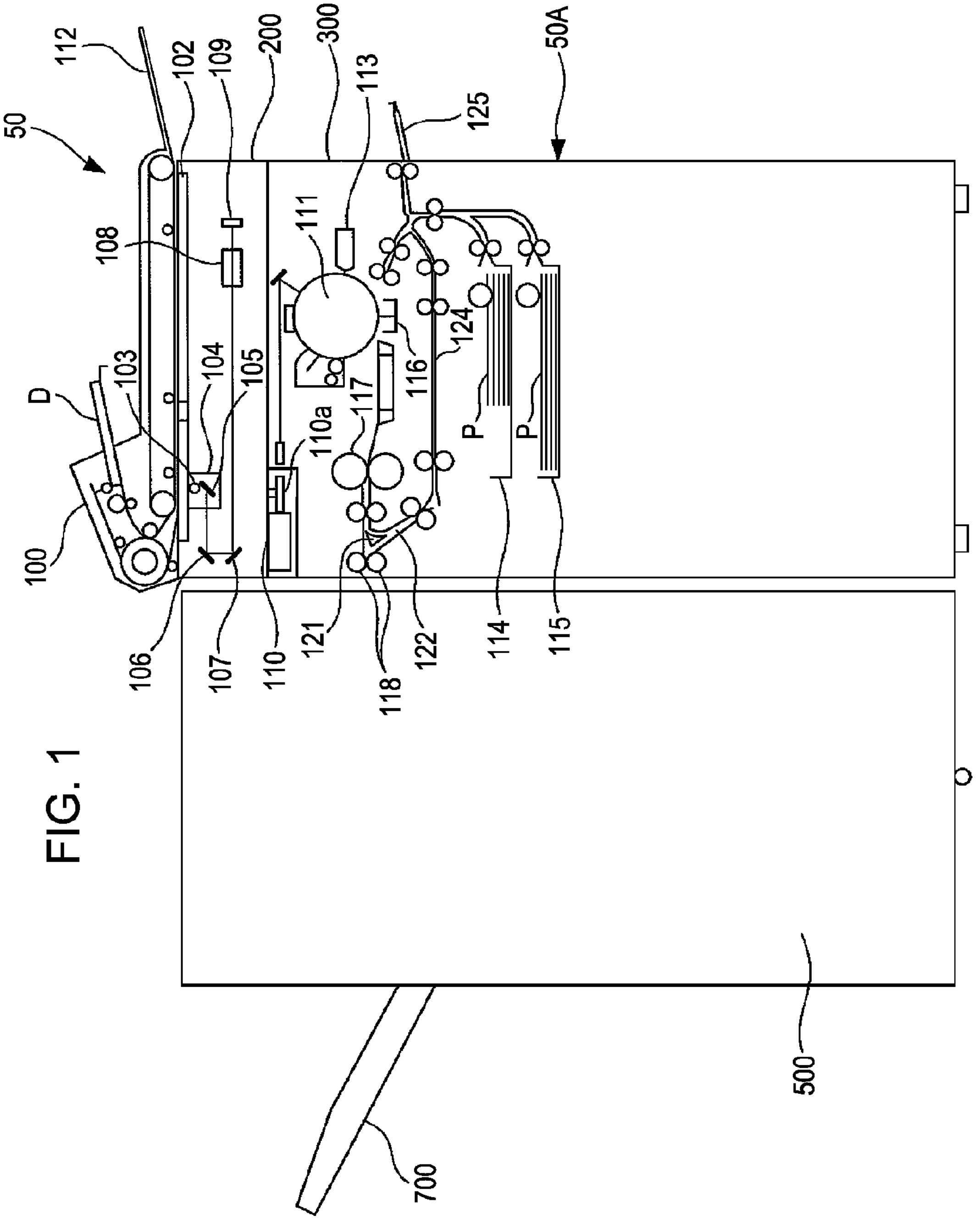
FIG. 1 illustrates the overall structure of an image forming apparatus including a sheet processing apparatus according to a first embodiment of the present invention.

FIG. 1 illustrates the overall structure of an image forming apparatus including a sheet processing apparatus according to a first embodiment of the present invention. FIG. 1 illustrates an image forming apparatus 50, an image forming apparatus main body 50A, an automatic document feeder (ADF) 100 provided on the upper surface of the image forming apparatus main body 50A, and a finisher 500, which is a sheet processing apparatus, configured to process sheets discharged from the image forming apparatus main body 50A.

FIG. 1 illustrates an image reader (image input apparatus) 200 configured to convert a document into image data. A printer 300 includes sheet cassettes 114 and 115 for holding different types of sheets and a manual paper feeder 125. The printer 300, which is an image forming portion, is configured to form a visible image on a sheet in accordance with a print instruction.

In this way, with the image forming apparatus 50, when an image is formed by reading a document image, first documents D can be stacked facing upward on the ADF 100. Then, the documents D are fed one by one to the left. Each of the documents D passes through a curved path and over a platen glass 102, where the document D moves left to right through a reading position. Then, the document D is discharged into a document discharge tray 112.

When the document D moves left to right through the reading position on the platen glass 102, the document image is read by a scanner unit 104 fixed in a position corresponding to the reading position. This method of reading a document is known as a "sheet-fed method."

More specifically, when the document D passes through the reading position, the surface of the document D to be read is irradiated with light from a lamp 103 of the scanner unit 104. Light reflected from the document D is guided to a lens 108 via mirrors 105, 106, and 107. The light that has passed through the lens 108 forms an image on the imaging plane of an image sensor 109.

By conveying the document D so that it passes through the reading position from left to right, the document D is scanned. Here, the width direction orthogonal to the conveying direction of the document D is the main scanning direction, and the conveying direction is the sub scanning direction. In other words, while the document D passes through the reading position, the image sensor 109 reads the document image line by line in the main scanning direction as the document D is conveyed in the sub scanning direction. In this way, the entire document image is read.

The optically read document image is converted into image data by the image sensor 109 and is discharged. Then, predetermined processing is carried out on the image data output from the image sensor 109 at an image signal control unit 202, described below with reference to FIG. 7. The processed image data is input to an exposure control portion 110 of the printer 300 as a video signal.

The image reader 200 may instead read a document image by conveying a document D onto the platen glass 102 by the ADF 100 and stopping the document D at a predetermined position. Then, in this state, the scanner unit 104 is scanned from left to right to read the document image. This reading method is known as a "flatbed method."

When a document image is read without using the ADF 100, the ADF 100 is lifted, and then a document D is placed on the platen glass 102. Then, by scanning with the scanner unit 104 from left to right, the document image is read. In other words, when a document image is read without using the ADF 100, the flatbed method is employed.

Subsequently, the exposure control portion 110 of the printer 300 modulates the laser beam on the basis of the input video signal and outputs the modulated laser beam. The modulated laser beam is scanned by a polygon mirror 110*a* and is emitted on a photosensitive drum 111 whose surface has been charged in advance. In this way, an electrostatic latent image is formed on the photosensitive drum 111 in accordance with the scanned laser beam. When the flatbed method is employed, the exposure control portion 110 outputs the laser beam so that a right image is formed (i.e., so that a mirror image is not formed). Then, the electrostatic latent image formed on the photosensitive drum 111 is developed into a visible image, i.e., toner image, by the toner supplied from a developer 113.

In synchronization with the start of laser irradiation, a sheet P is fed from one of the cassettes 114 and 115, the manual paper feeder 125, and a two-side conveying path 124. The sheet P is conveyed to a transfer portion constituted of the photosensitive drum 111 and a transfer charger 116. When the sheet P passes through the transfer portion, the developed image formed on the photosensitive drum 111 is transferred on the sheet P.

The sheet P on which the developed image is transferred is conveyed to a fixing portion 117. At the fixing portion 117, the sheet P is heated and pressurized so that the developed image is fixed on the sheet P. After the developed image is fixed, the sheet P is discharged to the outside (i.e., to the finisher 500) from the printer 300 through a flapper 121 and discharge rollers 118.

When the sheet P is discharged so that the surface on which the image is formed is facing downward (i.e., face down), the sheet P that has passed through the fixing portion 117 is once guided to a reversing path 122 by switching the document discharge tray 112. Then, when the trailing edge of the sheet P passes through the flapper 121, the sheet P is switched back and is discharged from the printer 300 by the discharge rollers 118.

Such a reversal discharge is carried out so as to form images in order from the first page when forming the images read by the ADF 100 or when forming images output from a computer. When reversal discharge is carried out, the discharged sheets are in the right order (i.e., in the order of the page numbers).

When a rigid sheet P, such as an overhead projector (OHP) sheet, is fed from the manual paper feeder 125 and an image is to be formed on this sheet P, the sheet P is not guided to the reversing path 122 and is discharged by the discharge rollers 118 with the surface on which the image is formed facing upward (i.e., face down).

When two-side recording is to be carried out so as to form images on both side of a sheet P, the sheet P is guided to the reversing path 122 by switching the flapper 121 and is then conveyed to the two-side conveying path 124. Then, the sheet P guided to the two-side conveying path 124 is conveyed back to the transfer portion at a predetermined timing.

Figure 2:
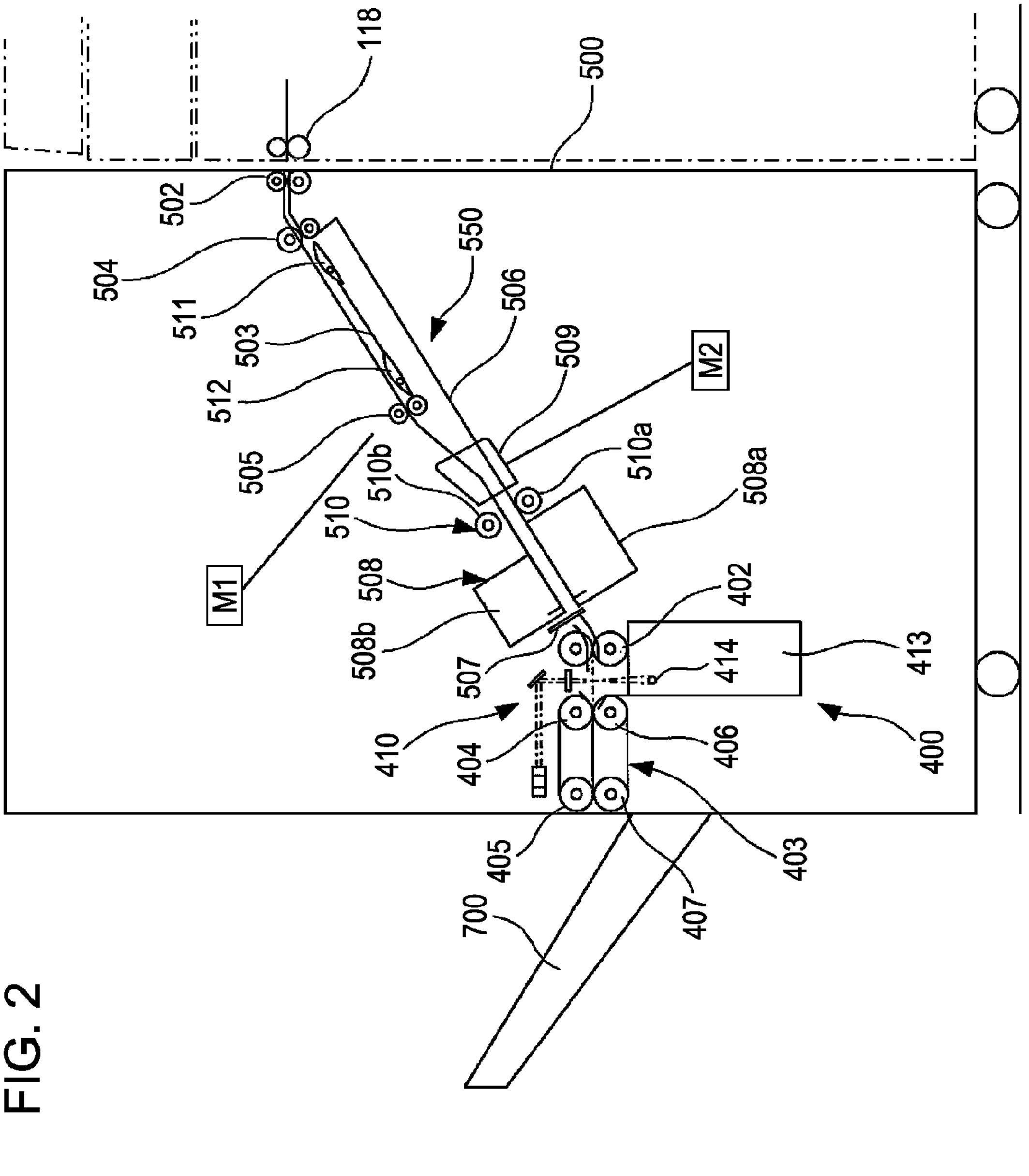
FIG. 2 illustrates the overall structure of a finisher, which is a sheet processing apparatus.

As shown in FIG. 2, the finisher 500 includes a bookbinding portion 550 that receives a plurality of sheets P from the image forming apparatus main body 50A, stacks and aligns the edges of the sheets P to form a sheet bundle PA, and binds the sheet bundle PA with staples. The finisher 500 also includes a cutting portion 400 that cuts a sheet P or a sheet bundle PA into a desired shape, and a stack tray 700 that stores the products obtained by cutting the sheet P or sheet bundle PA.

The bookbinding portion 550 includes a processing tray 506 where the plurality of received sheets P are stacked and aligned to form a sheet bundle PA and a staple unit 508 that staples the sheet bundle PA on the processing tray 506.

The processing tray 506 is tilted so that downstream in the conveying direction is lower, and at the end of the processing tray 506, a stopper 507 is provided. In this way, when a sheet P is discharged to the processing tray 506, the edge of this sheet P is stopped at the stopper 507 by gravity. A pair of aligning plates 509 that aligns the edges of sheets P stored in the processing tray 506 in the width direction is provided. By moving the aligning plates 509 in the width direction by an aligning motor M2, the edges of sheets are aligned in the width direction.

The staple unit 508 is disposed upstream of the stopper 507, close to the stopper 507. The staple unit 508 includes a driver unit 508*a* that shoots out a staple and a clincher unit 508*b* that bends the staple.

As shown in FIG. 2, inlet rollers 502 that receive sheets P discharged from the discharge rollers 118 of the printer 300 are provided upstream of the bookbinding portion 550. The sheets P received by the inlet rollers 502 are discharged to the processing tray 506 through conveying rollers 504 and 505 provided in a conveying path 503.

A pair of bundle conveying rollers 510 that convey a sheet bundle PA bound at the processing tray 506 downstream is interposed between the staple unit 508 and the aligning plates 509. The bundle conveying rollers 510 includes a fixed lower conveying roller 510*a* and an upper conveying roller 510*b* that freely attaches to and detaches from the lower conveying roller 510*a* by a solenoid (not shown).

The upper conveying roller 510*b* is normally disposed at a position retracted from the processing tray 506 so that it does not interfere with the sheets P being stored in the processing tray 506. The upper conveying roller 510*b* moves toward the lower conveying roller 510*a* only when a sheet bundle PA is discharge so as to apply pressure sufficient for conveying the sheet bundle PA. When a sheet bundle PA is discharge by the bundle conveying rollers 510, the stopper 507 retracts from the top surface of the sheets P stacked on the processing tray 506 to the position indicated by the dotted line by a solenoid (not shown) and opens a path toward the downstream area.

At the bookbinding portion 550, by having the stopper 507 constantly lowered and the bundle conveying rollers 510 in a nip position, sheets P can be conveyed without being stored in the processing tray 506.

FIG. 2 illustrates flappers 511 and 512 that are provided in the conveying path 503. The flappers 511 and 512 switch the inlet of the sheets P stored in the processing tray 506 and can be changed in accordance with the size of the sheets P. By providing the flappers 511 and 512, the leading edge of the next sheet P to be stored can be prevented from running into the trailing edge of the sheets P stored in the processing tray 506. A conveying motor M1 drives the rollers 502, 504, 505, and 510 at the same speed in the same direction.

Figure 3:
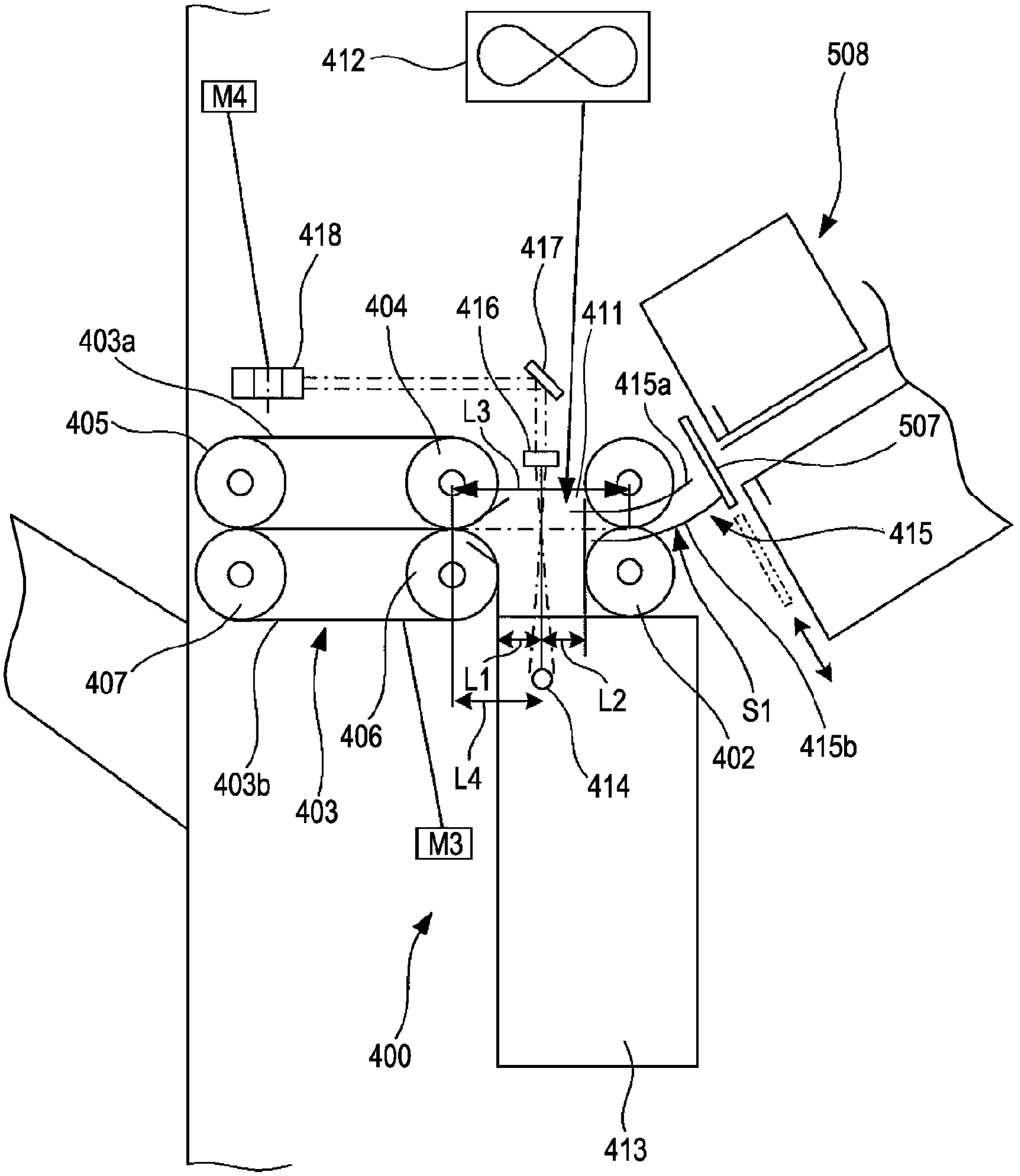
FIG. 3 illustrates the details of a laser processing unit provided on the finisher.
Figure 4:
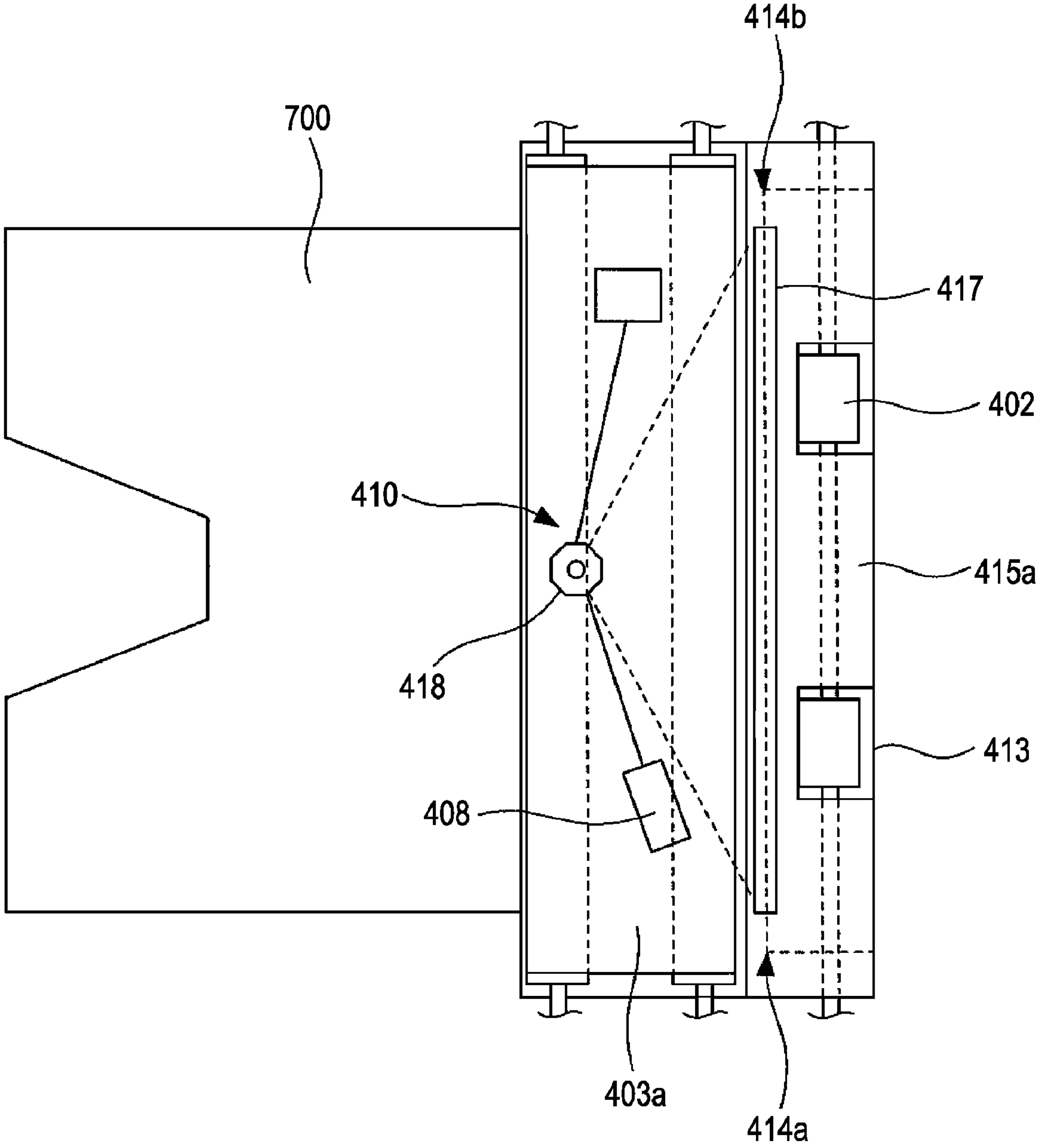
FIG. 4 is a top view of the laser processing unit.

As shown in FIGS. 3 and 4, the cutting portion 400 is disposed downstream of the stopper 507 and includes a pair of processing conveying rollers 402 that receives a sheet P sent from the bookbinding portion 550. The cutting portion 400 also includes a pair of processing conveying belts 403 that discharges the sheet P received by the processing conveying rollers 402 to the outside of the apparatus. In addition, the cutting portion 400 includes a laser processing portion 410 that cut a sheet bundle PA into a desired shape by irradiating the sheet bundle PA that has been bound with staples with a laser beam having a predetermined pulse.

The laser processing portion 410, which is a laser processing unit, is disposed above a sheet conveying path formed between the processing conveying belts 403 that constitutes a second conveying portion and the processing conveying rollers 402 that constitutes a first conveying portion for conveying sheets P to the laser processing portion 410.

The processing conveying belts 403 includes a pair of belts that hold and convey a sheet or a product, i.e., an upper processing conveying belt 403*a* and a lower processing conveying belt 403*b* disposed parallel to each other in the vertical direction. At least the lower processing conveying belt 403*b* has a conveying surface that is continuous in the conveying direction and that supports the entire width of the sheet or product to be conveyed.

The processing conveying belt 403*a* is passed around a driving pulley 404 and an idler pulley 405, and the lower processing conveying belt 403*b* is passed around a driving pulley 406 and an idler pulley 407. Together with the processing conveying rollers 402, the processing conveying belts 403 work to convey sheets downstream (i.e., right to left in FIG. 3) by being driven by the driving pulleys 404 and 406 rotated by a processing conveying motor M3.

The laser processing portion 410 includes a laser generator 408, a polygon mirror 418, a mirror 417, a lens 416, and an air discharge nozzle 411. The lens 416, the mirror 417, and the polygon mirror 418 are arranged so that a laser beam generated at the laser generator 408 is emitted at the sheet conveying path at an orthogonal direction.

The air discharge nozzle 411 is provided near the irradiation portion of the lens 416. Air is blow against a sheet from the air discharge nozzle 411 in synchronization with laser irradiation. By blowing air from the air discharge nozzle 411 to a sheet P, scraps Pd generated when the sheet P is cut can be reliably dropped into a scrap box 413, as described below. The air from the air discharge nozzle 411 is supplied from an air supply unit 412 through a pipe (not shown).

The laser generator 408 generates a carbon dioxide laser beam. The laser beam is focused by the lens 416 at a sheet P that passes through the sheet conveying path. The power of the laser beam is set to a value suitable for cutting the sheet P disposed within the processing range that is a range from a point a predetermined distance forward of the focal point to a point a predetermined distance rearward of the focal point in the transmission direction of the laser beam.

The laser generator 408 emits, at a predetermined timing, a pulsed laser beam to the polygon mirror 418, which is a scanning portion rotated at a constant rate by a polygon motor M4. In this way, a sheet P can be irradiated with a laser beam in the main scanning direction orthogonal to the sheet conveying direction. A sheet P is irradiated with a laser beam in the sub scanning direction by moving the sheet P downstream in the sheet conveying direction by driving the processing conveying motor M3.

Driving of the processing conveying motor M3 and the polygon motor M4 is controlled by a finisher control unit 501, described below with reference to FIG. 7. Irradiation of a pulsed laser beam by the laser generator 408 is controlled by the finisher control unit 501 on the basis of a video signal corresponding to cutting process information, described below. By emitting a pulsed laser beam corresponding to the video signal, a sheet P (or bundle PA) can be cut into a desired shape.

As shown in FIG. 3, the irradiation position on the sheet P, i.e., the cutting position on the sheet P, along the sheet conveying direction is set at a position a distance L2 from the edge of the processing conveying rollers 402 and a distance L1 from the edge of the processing conveying belts 403. The distance between the axial center of the processing conveying rollers 402 and the axial center of the driving pulley 404 of the processing conveying belts 403 (hereinafter this distance is referred to as an "inter-axial conveying distance (inter-nip distance)") is represented by L3. The distance between the irradiation position on a sheet P and the axial center of the driving pulley 404 of the processing conveying belts 403 is represented by L4.

A pair of guides 415 that guide a sheet P is provided near the processing conveying rollers 402. The guides 415 are provided with a timing sensor S1. The irradiation timing of the laser generator 408 is determined on the basis of a detection signal from the timing sensor S1.

The scrap box 413, which is a collecting portion configured to store scraps Pd of a sheet P produced by laser cutting, is provided below the guides 415. The area downstream of the laser irradiation portion of an upper guide 415*a* of the guides 415 is tapered so as to guide a sheet P to the nip between the processing conveying belts 403. A lower guide 415*b* of the guides 415 is also tapered so as to guide the sheet P to the nip between the processing conveying belts 403. By providing tapered guides 415, a sheet P from the processing conveying rollers 402 can be reliably sent between the processing conveying belts 403.

A guiding member (not shown) is interposed between the processing conveying rollers 402 and the processing conveying belts 403. A sheet P is supported by this guiding member while it passes below the laser processing portion 410. The guiding member has a hole for laser processing (not shown) formed in the entire area corresponding to the area scanned by a laser beam. The scrap box 413 is disposed below this hole.

A collecting hole larger than the laser scanning area is formed in the upper surface of the scrap box 413. Through this collecting hole, the scrap box 413 receives all scraps Pd produced between the processing conveying rollers 402 and the processing conveying belts 403. The air discharge nozzle 411 functions to reliably drop the scraps Pd into the scrap box 413.

A detection sensor 414, which is a detecting portion configured to detect the height of the accumulated scraps Pd, is provided on the scrap box 413. As shown in FIG. 4, the detection sensor 414 is an optical sensor including a light-emitting portion 414*a* and a light detecting portion 414*b*. A collecting space is interposed between the light-emitting portion 414*a* and the light detecting portion 414*b* that are disposed parallel to the laser scanning direction below the irradiation position, i.e., the cutting position, on a sheet. By arranging the light-emitting portion 414*a* and the light detecting portion 414*b* in this way, the detection sensor 414 can reliably detect scraps Pd disposed along the laser scanning direction and at a height corresponding to the processing range.

The detection position of the detection sensor 414 is set to a position a predetermined distance lower than the processing range of a laser beam so that the scraps Pd in the scrap box 413 do not overheat even when the scraps Pd are irradiated with a laser beam from the laser generator 408. By setting the detection position of the detection sensor 414 in this way, i.e., by setting the detection position sufficiently lower than the processing range of the laser beam, overheating of scraps Pd collected in the scrap box 413 can be prevented. The detection position of the detection sensor 414 is set at a position a predetermined distance lower than the processing range of a laser beam so as to prevent the generation of smoke and burning odor caused by heat applied by the laser beam outside the processing range, even when the intensity of the laser beam is lower than that used for cutting a sheet P. Since the laser beam according to this embodiment is scanned in a direction orthogonal to the sheet conveying direction and is not constantly turned on, it is less likely that smoke and burning odor be generated. However, by employing such a structure, safety is ensured.

When the detection sensor 414 detects that scraps Pd are present for a predetermined period of time, the laser generator 408 stops generating a pulsed laser beam, and an alarm is sound to alert the user to remove the scraps Pd from the scrap box 413. Then, after the user removes the scraps Pd, the response of the detection sensor 414 is stopped, and operation continues.

Next, the cutting process of a sheet P (sheet bundle PA) carried out by each portion of the finisher 500 having the above-described structure will be described.

After the user completes setting the apparatus and a start signal is sent, the image forming apparatus main body 50A forms images on sheets P. Then, the printed sheets P are sequentially discharged from the discharge rollers 118 of the printer 300. The discharged sheets P are first received by the inlet rollers 502 of the finisher 500. Then, the sheets P pass through the flappers 511 and 512 that have been moved to positions corresponding to the size of the sheets P and are stored in the processing tray 506.

Figure 5:
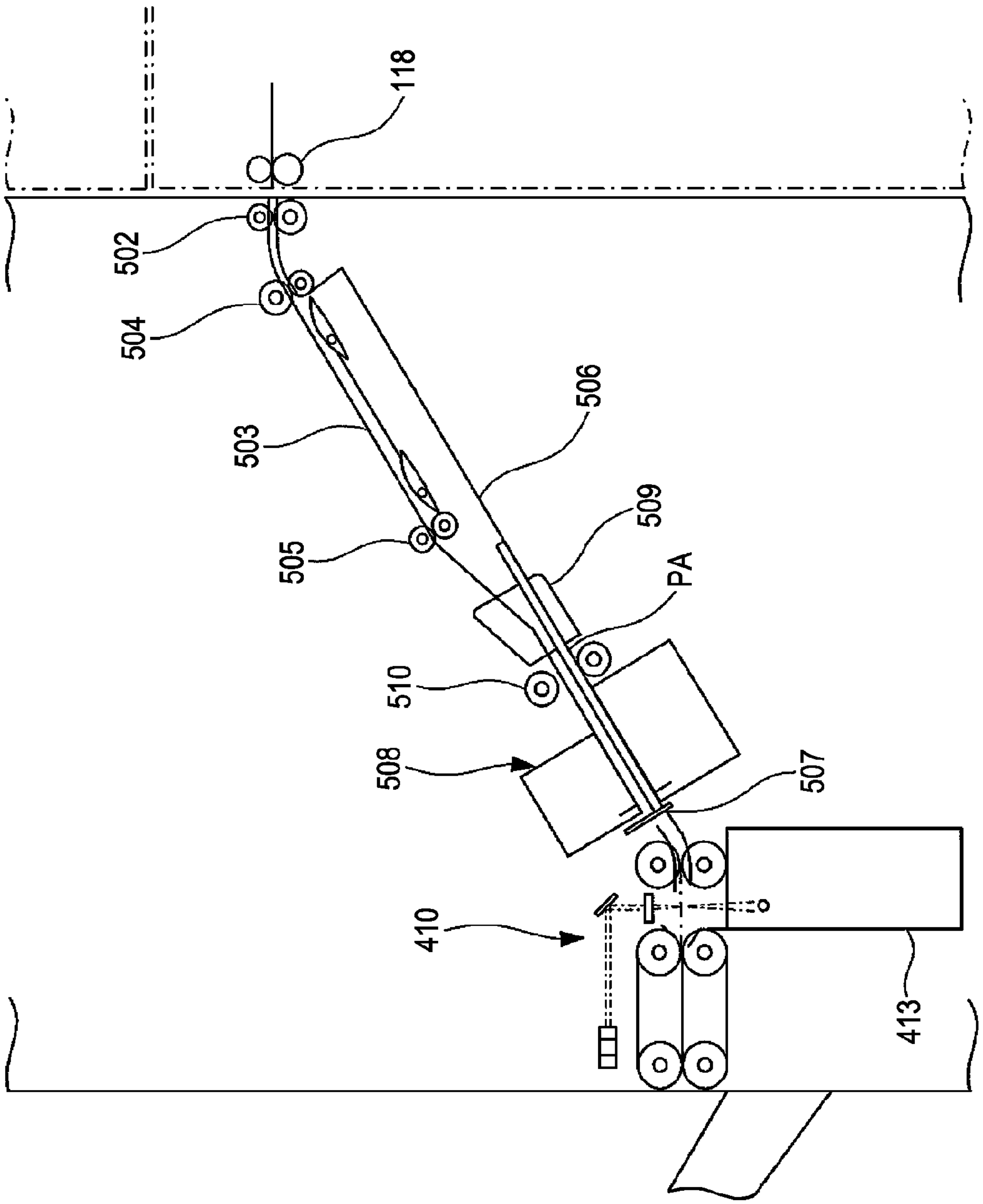
FIG. 5 is a first view illustrating the sheet cutting processes carried out by the finisher.

Next, the leading edges of the sheets P stored in the processing tray 506 are aligned with the stopper 507 as the sheets P receive the force of gravity. Then, the aligning plates 509 that were in stand-by positions, where the aligning plates 509 are spread apart in the width direction, come close together so as to align the edges of each sheet. By repeating this operation for each sheet P, a sheet bundle PA including a desired number of sheets P will be stored in the processing tray 506 in an aligned manner, as shown in FIG. 5. Then, the sheet bundle PA is bound with staples by the staple unit 508.

Next, the sheet bundle PA is held by the bundle conveying rollers 510 that have been in stand-by positions, where the aligning plates 509 are spread apart, and the stopper 507 moves to a retracted position. Subsequently, the sheet bundle PA held by the bundle conveying rollers 510 is conveyed downstream as the conveying motor M1 and the processing conveying motor M3 are driven in synchronization.

Figure 6:
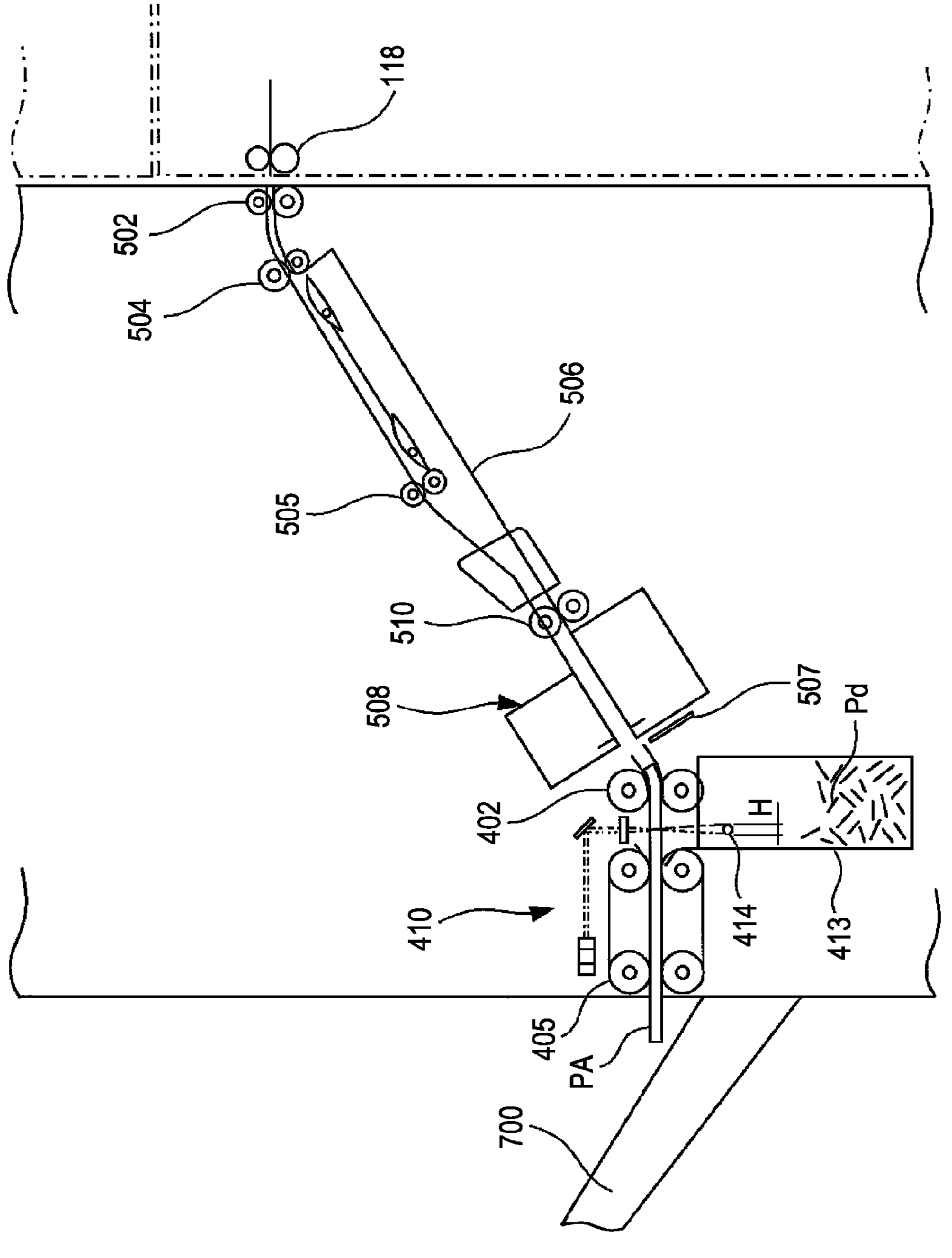
FIG. 6 is a second view illustrating the sheet cutting processes carried out by the finisher.

Next, as shown in FIG. 6, when cutting is to be carried out, the timing sensor S1 detects the leading edge of the sheet bundle PA, and laser cutting is carried out by the laser processing portion 410 in synchronization with the conveying of the sheet bundle PA. When such a laser processing is carried out, air is blown against the scrap box 413 from the air discharge nozzle 411. In this way, scraps Pd are reliably collected in the scrap box 413, without attaching to products being conveyed and without dispersing into gaps between the guides.

In this way, by irradiating the sheet bundle PA with a laser beam while the sheet bundle PA is located between the two conveying portions, desired sections of the sheet bundle PA can be cut, and scraps Pd produced during this cutting process can be reliably collected into the scrap box 413.

Every time laser cutting is carried out, the finisher control unit 501 (CPU (central processing unit) circuit portion 150), described below with reference to FIG. 7, monitors the detection sensor 414. When the detection of the detection sensor 414 is stopped, i.e., when the detection sensor 414 is transmissive, the upper surface H of the accumulated scraps Pd is lower than the detection sensor 414, as shown in FIG. 6. In this state, even when the scraps Pd are irradiated with a laser beam, the processing range of the laser beam does not match the upper surface of the scraps Pd. Therefore, even when the scraps Pd is irradiated with a laser beam, the laser beam does not have enough energy to overheat the scraps Pd, and thus, laser processing is permitted to be continued.

When the detection sensor 414 is detecting and this detection time of the detection sensor 414 exceeds the predetermined amount of time required for the scraps Pd to drop into the scrap box 413, i.e., when the detection sensor 414 is non-transmissive, it is determined that the upper surface of the accumulated scraps Pd is above the detection sensor 414, i.e., near the processing range of the laser beam.

In this state, since there is a possibility that the scraps Pd may be overheated by the laser beam, laser cutting is stopped, and an alarm for alerting the user to remove the scraps Pd is generated. After such an alarm is generated and the scraps Pd are removed, detection of the detection sensor 414 is stopped. In this way, the laser cutting operation is started again.

Next, the sheet bundle PA cut in a manner as described above, i.e., the product is discharged by the processing conveying belts 403 into the stack tray 700 standing by at the sheet-surface position. At this time, the product is conveyed from the laser processing position, where it was cut by laser processing, to the stack tray 700 by the processing conveying belts 403 having a continuous conveying surface in the conveying direction. Therefore, regardless of the length of the product in conveying direction, the product can be conveyed and discharged.

The above-described operation is repeated for the same number a times as the number of sheet bundles PA, and then the job is completed. The same advantages may be achieved even when, instead of the processing conveying belts 403, a plurality of conveying rollers, each having a conveying surface that is longer than the length of the products in the width direction, are disposed in the conveying direction with a pitch shorter than the length of the products in the conveying direction.

Figure 7:
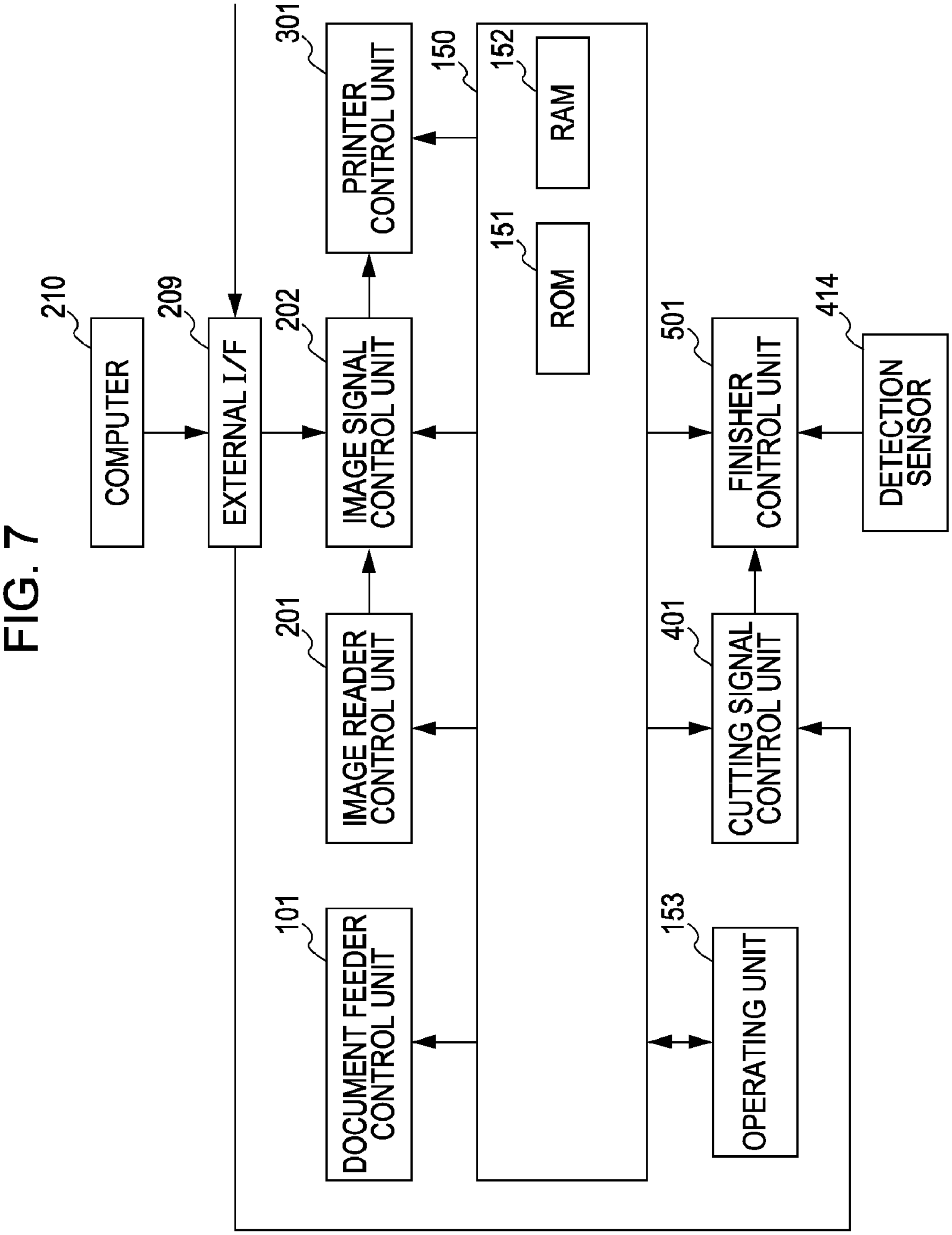
FIG. 7 is a control block diagram of the image forming apparatus.

FIG. 7 is a control block diagram illustrating the entire image forming apparatus having the above-described structure. FIG. 7 illustrates the CPU circuit portion 150, which constitutes a controller. A CPU (not shown), a read only memory (ROM) 151, and a random access memory (RAM) 152 are embedded in the CPU circuit portion 150. A control program stored in the ROM 151 controls a document feeder control unit 101, an image reader control unit 201, and a printer control unit 301. The CPU circuit portion 150 controls an image signal control unit 202, a cutting signal control unit 401, and a finisher control unit 501.

The RAM 152 temporarily stores control data and is used as a work area for carrying out computation required for control. The document feeder control unit 101 drives the ADF 100 on the basis of an instruction from the CPU circuit portion 150. The image reader control unit 201 drives the scanner unit 104, the image sensor 109, and so on, and transfers an analog image signal output from the image sensor 109 to the image signal control unit 202, as described above.

The image signal control unit 202 converts the analog image signal from the image sensor 109 into a digital signal, carries out various types of processing on the obtained digital signal so as to convert the digital signal into a video signal, and outputs the obtained video signal to the printer control unit 301. Various types of processing are carried out on a digital image signal input via an output interface (I/F) 209 so as to convert this digital signal into a video signal, and the obtained video signal is output to the printer control unit 301. The processing carried out by the image signal control unit 202 is controlled by the CPU circuit portion 150. The printer control unit 301 drives the above-described exposure control portion 110 on the basis of an input video signal.

FIG. 7 illustrates an operating unit 153 provided on the image forming apparatus main body 50A. The operating unit 153 includes a plurality of keys that are used to set various functions related to image forming and a display portion that displays information about the settings. The operating unit 153 outputs key signals, corresponding to key operations, to the CPU circuit portion 150 and displays on the display portion information corresponding to signals sent from the CPU circuit portion 150.

The cutting signal control unit 401 carries out various types of processing on a digital cutting signal input from a computer 210 via the external I/F 209, converts the digital cutting signal into a video signal, and outputs the obtained video signal to the finisher control unit 501. The processing by the cutting signal control unit 401 is controlled by the CPU circuit portion 150.

The finisher control unit 501 is mounted on the finisher 500 and drives the entire finisher 500, including the laser processing portion, by transmitting and receiving information to and from the CPU circuit portion 150. In this embodiment, the finisher control unit 501 is mounted on the finisher 500. Instead, however, the finisher control unit 501 may be provided on the image forming apparatus main body 50A as a single unit with the CPU circuit portion 150 so as to directly control the finisher 500 by the image forming apparatus main body 50A. When a video signal is sent from the cutting signal control unit 401 to the finisher control unit 501, the laser processing portion 410 is driven on the basis of the video signal or cutting process information from the operating unit 153, including the length of a sheet P in the conveying direction, the length of the leading edge section to be cut off from the sheet P, and the length of the trailing edge section to be cut off from the sheet P.

Next, the laser processing control by the finisher control unit 501 and the cutting signal control unit 401 will be described with reference to the flow chart in FIG. 8.

Cutting process information corresponding to the operation carried out by the user is set at the computer 210, which is an input portion, and is sent to the cutting signal control unit 401 via the external I/F 209. Such cutting process information may include information such as the cutting position when the leading edge section is to be cut off, the size of a hole when a hole is to be formed, the cutting position when the trailing edge section is to be cut off, and whether or not a stapled sheet bundle PA is to be cut. Such cutting process information, i.e., the length of the leading edge section of the sheet P to be cut, the length of the trailing edge section of the sheet P to be cut, or the length of the sheet P in the conveying direction, may be input by the operating unit 153, which is an input portion.

The cutting signal control unit 401 determines whether a cutting instruction for cutting an edge section of a sheet P is included in the cutting process information (Step 1).

Figure 9:
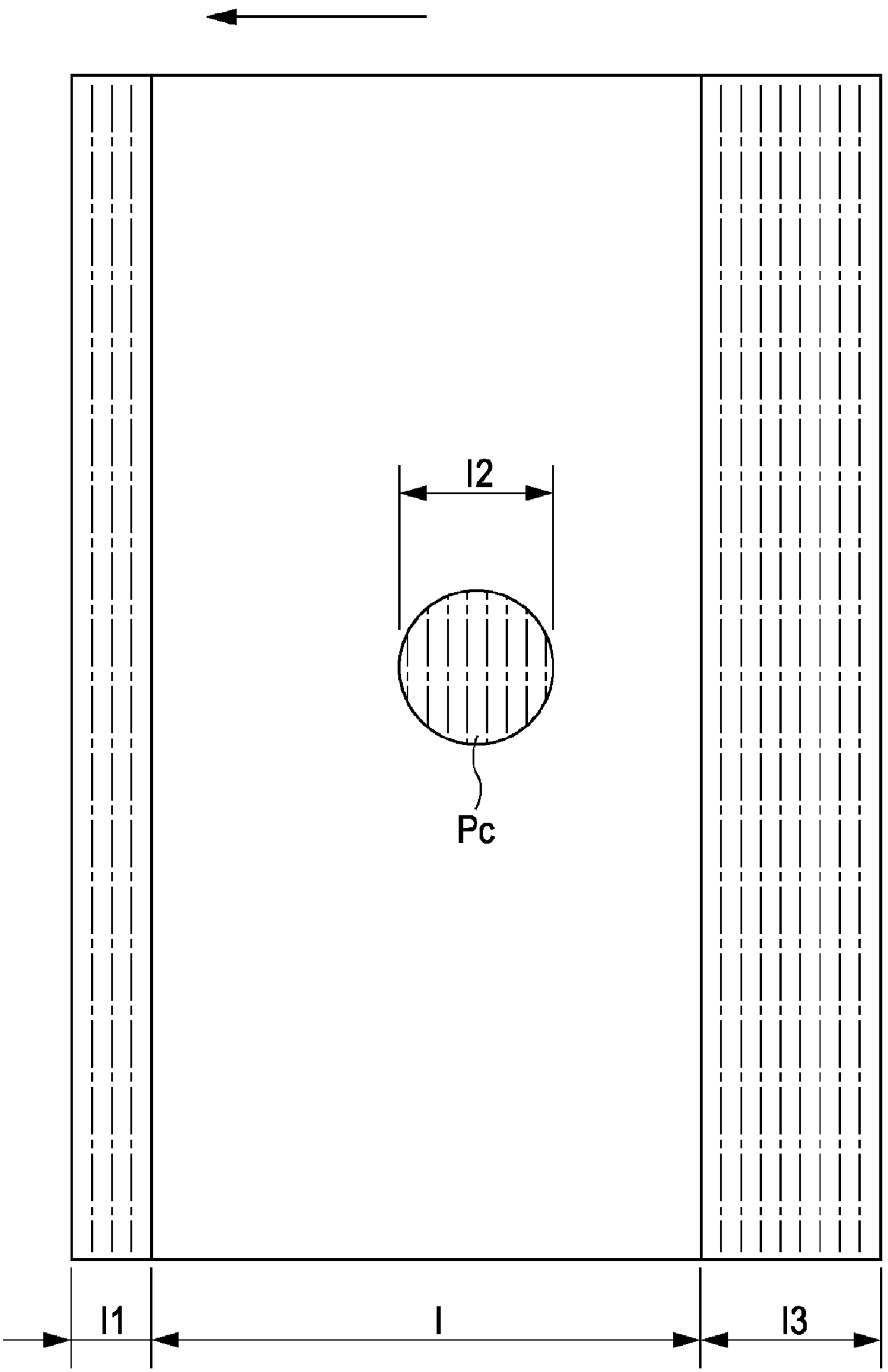
FIG. 9 is a top view illustrating sections of a sheet to be cut off by the laser processing unit.

When a cutting instruction for cutting off the leading edge section is included (Yes in Step 1), the length l of the sheet P in the conveying direction after the sheet P is cut (hereinafter the resulting sheet P obtained after cutting is referred to as a "product"), as shown in FIG. 9, is compared with the inter-axial conveying distance L3, described above with reference to FIG. 3 (Step 2).

When $l<L3$ (No in Step 2), the product cannot be passed from the processing conveying rollers 402 to the processing conveying belts 403 after cutting. Therefore, in such a case, a message alerting the user to prohibit the job is displayed on a display portion (not shown) of the operating unit 153 before operation is started (Step 13).

When $l \geqq L3$ (Yes in Step 2), the length l1 in the conveying direction of the leading edge section to be cut off from the product shown in FIG. 9 (hereinafter this section is referred to as an “unwanted leading-edge section”) is compared with the length L1 from the irradiation position on the sheet P to the edge of the processing conveying belts 403 (refer to FIG. 3) (Step 3). If $l1 \leqq L1$ (Yes in Step 3), the section cut off by the laser beam, i.e., scrap, falls into the scrap box 413 by gravity.

When $l1>L1$ (No in Step 3), the leading edge of the unwanted leading-edge section reaches the processing conveying belts 403 while it is being cut off, and therefore, the unwanted leading-edge section, i.e., scrap, does not fall into the scrap box 413 and is conveyed by the processing conveying belts 403.

Therefore, at this time, when it is determined that the leading edge of the sheet P reaches the processing conveying belts 403 when the cutting is started, a segmentation signal that sets the cutting position of the leading edge section of the sheet P to $l1 \leqq L1$ is generated (Step 14). In this way, a section of the sheet P from the cutting position to the leading edge can be cut off before the leading edge of the sheet P reaches the processing conveying belts 403.

Next, it is determined whether hole formation is to be carried out (Step 4). When the leading edge section is not to be cut off (No in Step 1), subsequently, it is determined whether hole formation is to be carried out (Step 4). When hole formation is to be carried out (Yes in Step 4), the length l2 of an intermediate cut section Pc that is to be cut out by forming a hole in the sheet P, as shown in FIG. 9, is compared with the length L1 from the irradiation position on the sheet P to the edge of the processing conveying belts 403 (Step 5).

When $l2 \leqq L1$ (Yes in Step 5), a scrap produced by laser cutting falls into the scrap box 413 by gravity. However, when $l2>L1$ (No in Step 5), the leading edge of the cut section Pc reaches the processing conveying belts 403. Therefore, the produced scrap, i.e., the cut section Pc, does not fall into the scrap box 413 and is conveyed by the processing conveying belts 403.

Therefore, at this time, when it is determined that the position where a hole is to be formed reaches the processing conveying belts 403 before the hole is formed, a segmentation signal that sets the hole forming position to $l2 \leqq L1$ is generated (Step 15). In other words, to collect the generated scrap into the scrap box 413 during hole formation, when $l2>L1$, a segmentation signal that sets the hole forming position to $l2 \leqq L1$ is generated. In this way, a hole may be formed in the sheet P before the leading edge of the hole reaches the processing conveying belts 403.

Next, it is determined whether the trailing edge section is to be cut off (Step 6). Even when hole formation is to be carried out (No in Step 4), it is subsequently determined whether the trailing edge section is to be cut off (Step 6).

When the trailing edge section is to be cut off (Yes in Step 6), the length 1 of the product in the conveying direction is compared with the length L4 from the irradiation of position on the sheet P to the axial center of the driving pulley 404 of the processing conveying belts 403, as shown in FIG. 3 (Step 7). Since the trailing edge section is cut off after the sheet P is received by the processing conveying belts 403, the length of the product is $l \geqq L4$. Therefore, when $l<L4$ (No in Step 7), a message alerting the user to prohibit the job is displayed on a display portion of the operating unit 153 before operation is started (Step 16).

When $l \geqq L4$ (Yes in Step 7), the length l3 in the conveying direction of the trailing edge section to be cut off from the product shown in FIG. 9 (hereinafter this section is referred to as an “unwanted trailing-edge section”) is compared with the length L1+L2 from edge of the processing conveying rollers 402 to the edge of the processing conveying belts 403 (refer to FIG. 3) (Step 8). If $l3 \leqq L1+L2$ (Yes in Step 8), the section cut off by the laser beam, i.e., scrap, falls into the scrap box 413 by gravity.

When $l3>L1+L2$ (No in Step 8), the unwanted trailing-edge section reaches the processing conveying belts 403 after being cut off, and therefore, the unwanted trailing-edge section, i.e., scrap, does not fall into the scrap box 413 and is conveyed by the processing conveying belts 403.

Therefore, at this time, when it is determined that the cutting position of the trailing edge section is set at a position where the length of the cut off trailing edge section in the conveying direction is longer than the length from the processing conveying rollers 402 to the processing conveying belts 403, a segmentation signal that sets the cutting position of the leading edge section of the sheet P to $l3 \leqq L1+L2$ is generated (Step 17). In this way, the sheet P can be cut at a position where the section between the trailing edge of the cut sheet P and the trailing edge of the sheet P before being cut is shorter than the distance between the edge of the processing conveying rollers 402 and the processing conveying belts 403.

The cutting signals generated in Steps 14, 15, and 17 are sent to the finisher control unit 501. The finisher control unit 501 controls the laser processing portion 410 on the basis of the segmentation signals so as to cut the leading-edge unwanted section, the cut section Pc, and the trailing-edge unwanted section in segments as shown in FIG. 9 as dotted lines. The length of the segments in the conveying direction is shorter than the length L1 so that the segments fall into the scrap box 413 by gravity.

Next, it is determined whether the processed sheet P is a sheet bundle PA bound with staples (Step 9). Even when the trailing edge section is not to be cut (No in Step 6), it is subsequently determined whether the processed sheet P is a sheet bundle PA bound with staples (Step 9).

Figure 10A:
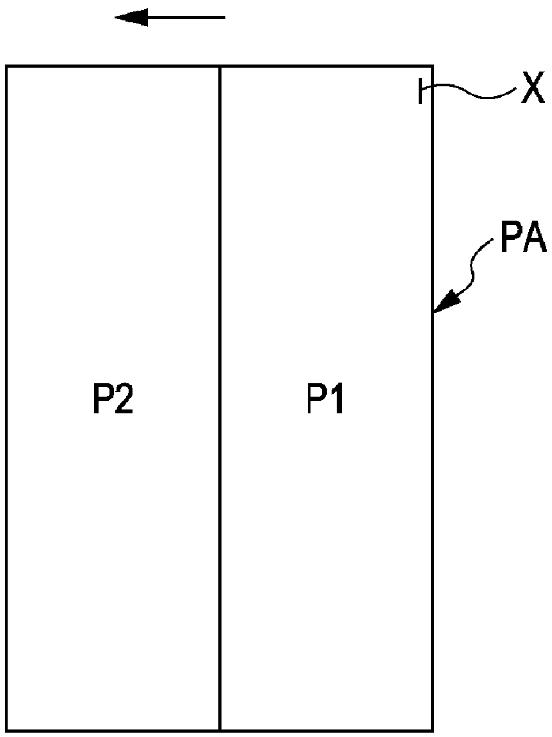
FIGS. 10A and 10B are top views illustrating the process of cutting a stapled sheet bundle cut in a scanning direction by the laser processing unit.
Figure 10B:
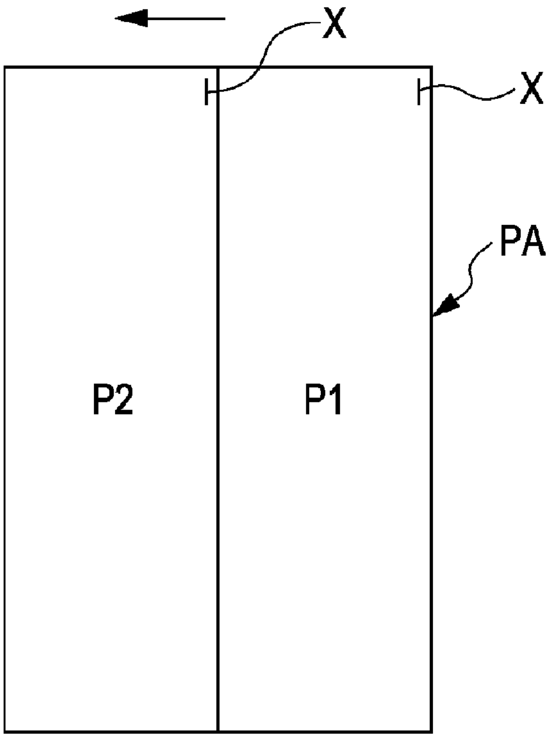

According to this embodiment, when binding a sheet bundle PA, one of two methods are employed: a method of biding a sheet bundle PA with one staple X at a position at the far end, as shown in FIG. 10A, or a method of stapling all products P1 and P2 generated by cutting, which are to be conveyed, are stapled with staples X, as shown in FIG. 10B.

When the processed sheet P is a stapled sheet bundle PA (Yes in Step 9), it is subsequently determined whether all products P1 and P2 of the bound sheet bundle PA are stapled with staples X (Step 10).

When all products P1 and P2 are stapled with staples X (Yes in Step 10) or when the processed sheet P is not a sheet bundle PA (No in Step 9), the cutting signal control unit 401 outputs a laser processing start signal to the finisher control unit 501. The finisher control unit 501 starts laser processing on the basis of the laser processing start signal (Step 11).

As shown in FIG. 10A, when both products P1 and P2 of a sheet bundle PA are not stapled with staples X (No in Step 10), if the sheet bundle PA is cut along the scanning direction, the product P2 that is not stapled with a staple X will be conveyed in an unbound state. When the product P2 is conveyed in an unbound state, the sheets P of the product P2 may scatter before reaching the stack tray 700. Therefore, in such a case, a message alerting the user to prohibit the job is displayed on the display portion of the operating unit 153 before operation is started (Step 18).

Next, the finisher control unit 501 starts laser processing on the basis of the various signals sent from the cutting signal control unit 401. When all sheet bundles PA are discharged (Yes in Step 12), laser processing is completed, and preparation for the next job is carried out.

The processed products, for example, the products P1 and P2 shown in FIG. 10B, are loaded onto the stack tray 700 by the processing conveying belts 403. Regardless of the number of sheets P to be stacked on the stack tray 700, the stack tray 700 is risen or lowered by rotating the processing conveying belts 403 clockwise or counter-clockwise by a tray motor M5 that rotates on the basis of an output from a paper-surface sensor (not shown) so as to set the loading position of the stack tray 700 at a predetermined height.

To be discharged into the stack tray 700, the products P1 and P2 are conveyed from the laser processing position to the stack tray 700 by the processing conveying belts 403 having continuous conveying surfaces. Therefore, regardless of the lengths of the products P1 and P2 in the conveying direction, conveying and discharging of the products P1 and P2 are possible.

Figure 11A:
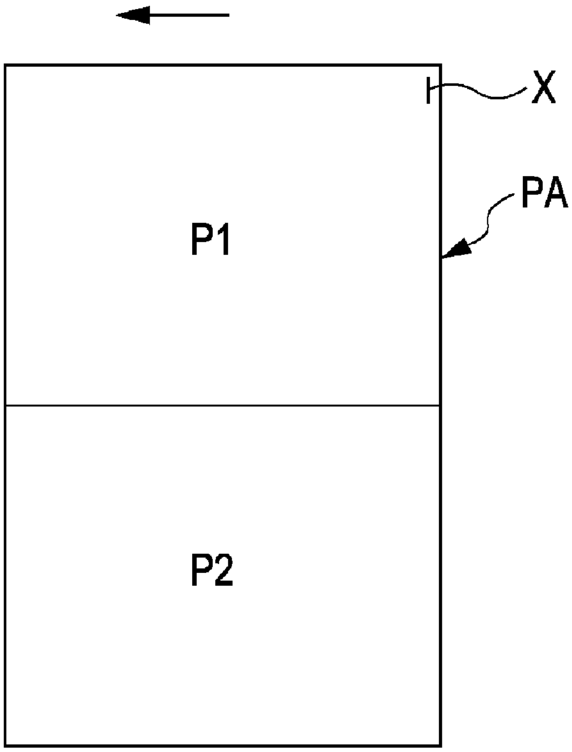
FIGS. 11A and 11B are top views illustrating the process of cutting a stapled sheet bundle cut in a sub scanning direction by the laser processing unit.
Figure 11B:
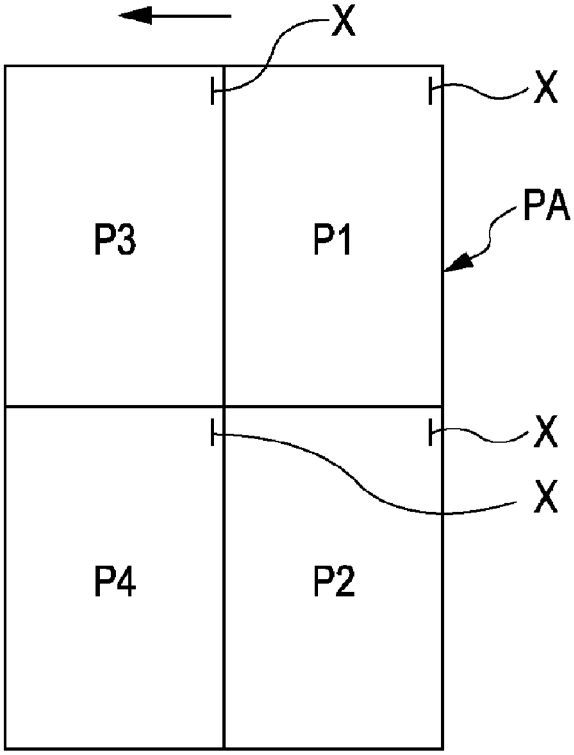

In the above, a case in which a sheet bundle PA is cut a plurality of times along the scanning direction has been described. As shown in FIGS. 11A and 11B, a sheet bundle PA may be cut a plurality of times along the sub scanning direction. As shown in FIG. 11B, when each of products P1 to P4 is bound with a staple X, laser processing may be started.

However, as shown in FIG. 11A, if the sheet bundle PA is cut in the sub scanning direction when each of products P1 and P2 is no bound with a staple X, the unbound product P2 will be conveyed in an unbound state. In such a case, a message alerting the user to prohibit the job is displayed on the display portion of the operating unit 153 before operation is started.

When cutting a sheet bundle PA in the sub scanning direction, if unwanted sections Pw are interposed between products P1 to P4, similar to the case when a leading edge section is to be cut off, segmentation signals for cutting the unwanted sections Pw with a length equal to or shorter than L1 are generated, and cutting is carried out.

Although the products P1 to P4 have a short length in the width direction, the products P1 to P4 will be conveyed to the stack tray 700 without any problems because the processing conveying belts 403 has a surface that can support the entire length in the width direction of the sheet P to be conveyed.

In this way, it is determined before a sheet P (or a bundle PA) is cut whether or not products can be conveyed by the processing conveying belts 403. If it is determined that products can be conveyed, the laser processing portion 410 is driven to reliably convey the products. As a result, paper jam in the conveying path 10 can be prevented.

As described above, by driving the laser processing portion 410 according to the length of a leading edge section to be cut off from a sheet P and the length of a trailing edge section to be cut off from the sheet P, scraps Pd produced when the sheet P is processed fall into the scrap box 413. In this way, the scraps Pd produced when the sheet P is processed can be reliably collected.

As the above-described embodiment, by setting the detection position of the detection sensor 414 configured to detect the height of scraps Pd accumulated in the scrap box 413 below the processing range of the laser beam, the scraps Pd collected into the scrap box 413 can be prevented from being overheated by the laser beam.

As described above, according to this embodiment, scraps Pd of sheets P can be reliably collected into the scrap box 413. In addition, the height of the scraps Pd accumulated in the scrap box 413 can be detected by the detection sensor 414 when the scraps Pd reach a predetermined height.

Figure 13:
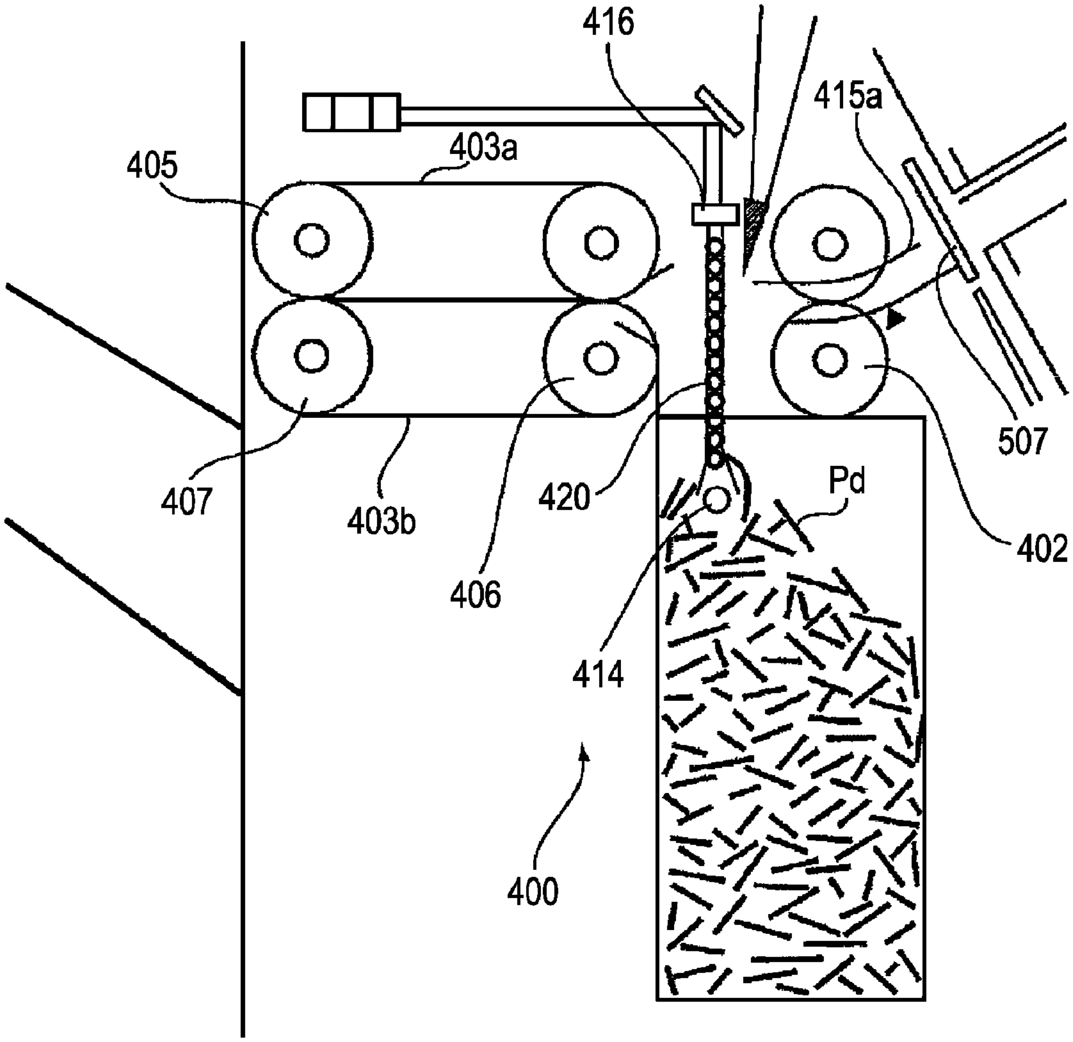
FIG. 13 illustrates a detection sensor and a range sensor provided on a scrap box that stores scraps of sheets cut by the laser processing unit.

However, depending on the shapes of scraps Pd and the condition of the scraps Pd when they fall into the scrap box 413, as shown in FIG. 13, a scraps Pd may be positioned close to the processing range of the laser beam when the detection sensor 414 is in a transmissive state. In other words, even when the detection sensor 414 does not detect a scraps Pd at a predetermined height, the scrap Pd may actually be located close to the processing range of the laser beam.

Accordingly, with this embodiment, to prepare for such a situation, a region sensor 420, which function as a region detecting portion configured to detect a scrap Pd on a laser beam is interposed between the lens 416 on which the laser beam is incident to the detection sensor 414, as shown in FIG. 13.

The region sensor 420 is an optical line sensor including optical sensors disposed parallel to each in the vertical direction. Similar to the detection sensor 414, a light-emitting portion and a light-detecting portion (not shown) of the region sensor 420 are disposed parallel to each in the laser scanning direction with a collecting space interposed therebetween.

According to this embodiment, when the region sensor 420 detects a scraps Pd, the finisher control unit 501 (CPU circuit portion 150) limits the emission of the laser beam or limits the rotation of the polygon mirror 418 by controlling the rotation of the polygon motor M4.

By limiting the emission of the laser beam or limiting the rotation of the polygon mirror 418, laser beam irradiation can be prohibited in regions other than a conveying region when a sheet P is conveyed for processing. When laser processing is carried out, even if a sheet P to be processed is positioned in the conveying region of the sheet P and a scrap Pd is present in the processing range of the laser beam within the conveying region of the sheet P, the energy of the laser beam emitted to the scrap Pd is reduced because the laser beam has already cut the sheet P. By prohibiting laser emission in regions other than the conveying region, a laser beam that has not been emitted at a sheet P, i.e., a laser beam whose energy has been reduced, is prevented from being directly emitted to a scrap Pd positioned in a region other than the conveying region of a sheet P. In this way, even when a scrap Pd is at a position shown in FIG. 13, the scrap Pd can be prevented from being overheated by a laser beam. When a scrap Pd is detected by the region sensor 420 in the conveying region of a sheet P when a sheet P to be processed is not conveyed, an alert may be displayed.

Next, a second embodiment of the present invention will be described.

Figure 14:
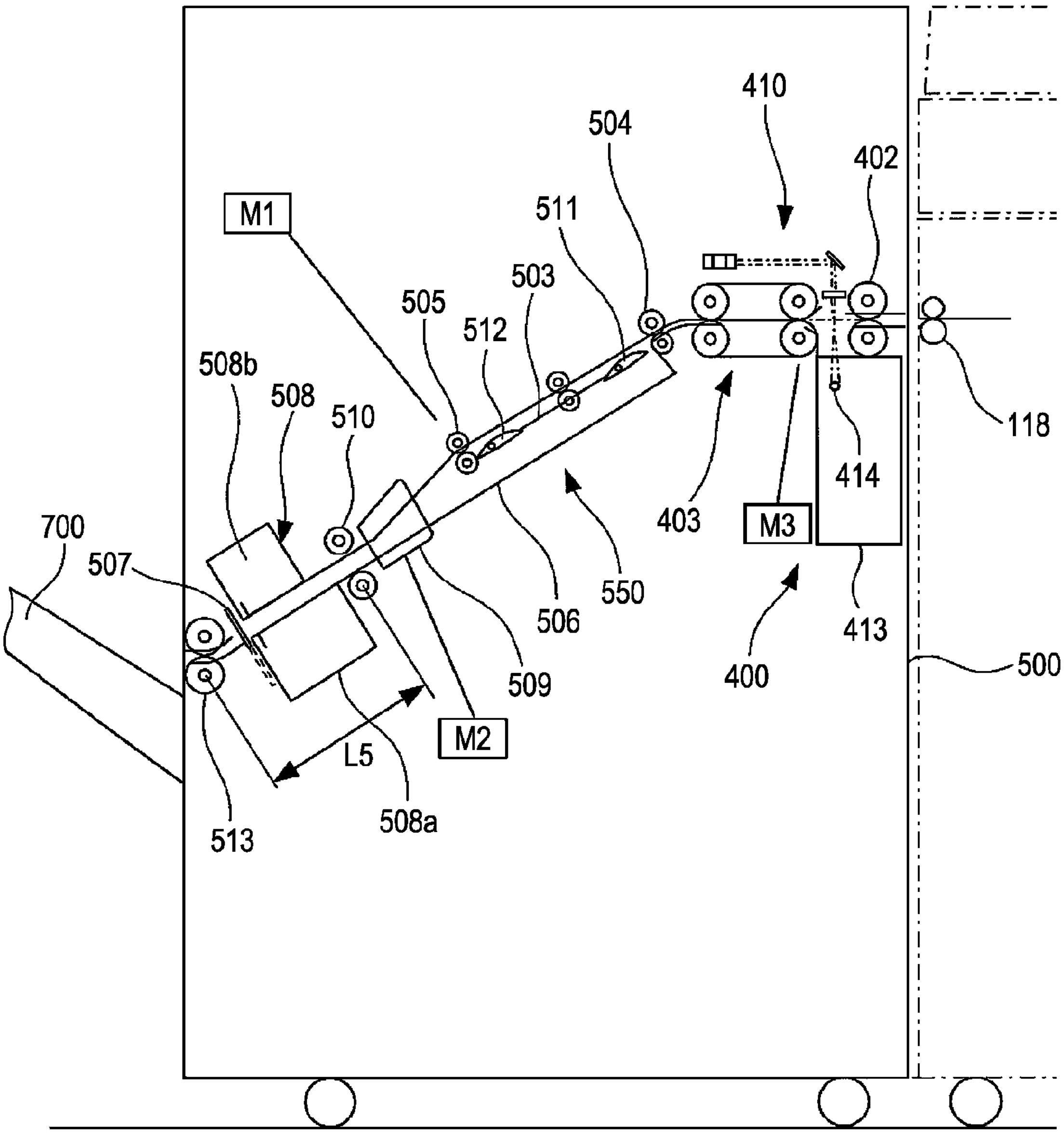
FIG. 14 illustrates the overall structure of a finisher, which is a sheet processing apparatus according to a second embodiment of the present invention.

FIG. 14 illustrates the overall structure of a finisher 500, which is a sheet processing apparatus, according to this embodiment. In FIG. 14, units that are the same or equivalent to those shown in FIG. 2 are represented with the same reference numerals as those in FIG. 2.

According to this embodiment, a cutting portion 400 is interposed between discharge rollers 118 of a printer 300 and a bookbinding portion 550.

In this case, sheets P discharged from the discharge rollers 118 are passed to a processing conveying rollers 402, are passed through the cutting portion 400, and are stored in a processing tray 506. Then, the edges of the sheets P are aligned, and the sheets P are stapled. Subsequently, the stapled sheets P are discharged to a stack tray 700 by bundle discharge rollers 513. The bundle discharge rollers 513 are driven by a conveying motor M1.

According to this embodiment, laser cutting is carried out upstream of the processing tray 506. Therefore, sheets P each cut in desired shapes can be bound. However, unless the length 1 of each desired product is greater than the pitch (inter-axial distance) of the pair of rollers disposed downstream of the cutting portion 400, the sheets P cannot be conveyed.

Figure 15:
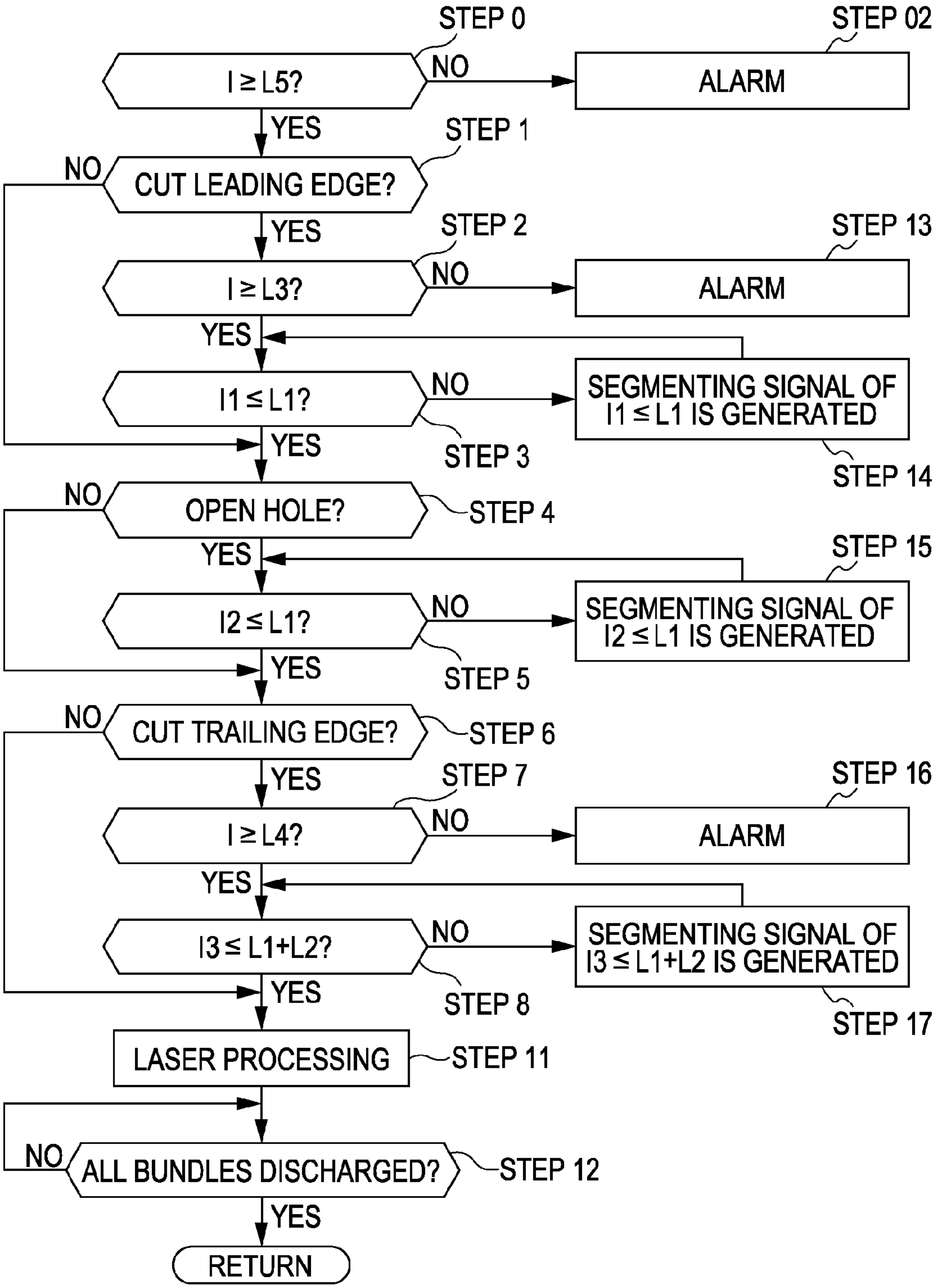
FIG. 15 is a flow chart illustrating the laser processing control of the finisher.
Figure 16:
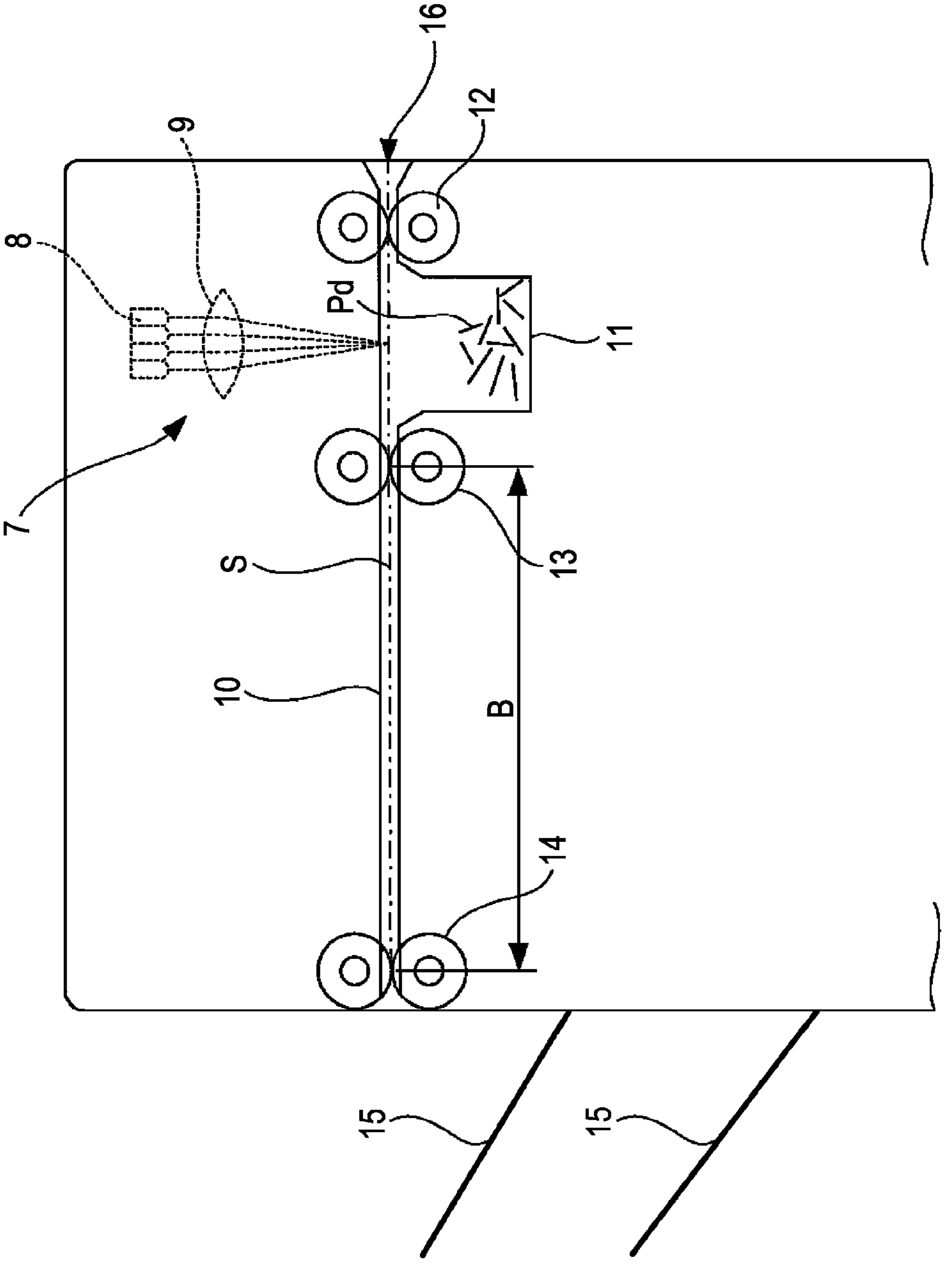
FIG. 16 PRIOR ART
FIG. 16 illustrates a known sheet processing apparatus.
Figure 17:
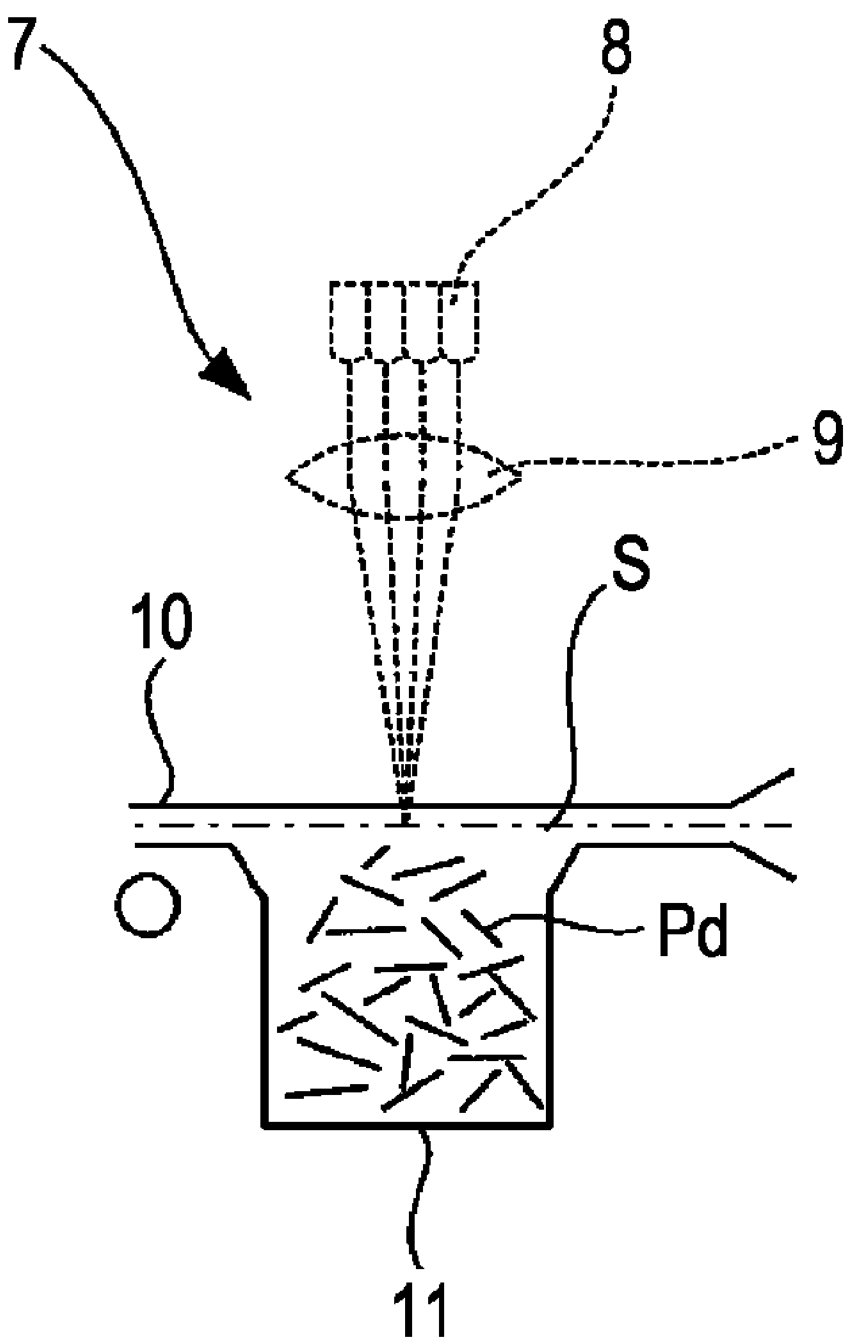
FIG. 17 PRIOR ART
FIG. 17 illustrates a known scrap box when the amount of scraps of sheets collected in the scrap box is great.

For example, according to this embodiment, if the pitch L5 of the bundle conveying rollers 510 and the bundle discharge rollers 513, constituting a second conveying portion, are set to a maximum conveying pitch, the pitch L5 must be set equal to or smaller than the length l (l≧L5). Therefore, as shown in FIG. 15, according to this embodiment, when cutting process information is sent, the cutting signal control unit 401 compares the length 1 of products in the conveying direction with the pitch L5 between the bundle conveying rollers 510 and the bundle discharge rollers 513 (Step 0).

If l≧L5 (Yes in Step 0), it is determined whether or not an instruction for cutting the leading edge of a sheet P is included in the cutting process information (Step 1). If l<L5 (No in Step 0), a message alerting the user to prohibit the job is displayed on a display portion (not shown) of the operating unit 153 before operation is started (Step 02).

Figure 8:
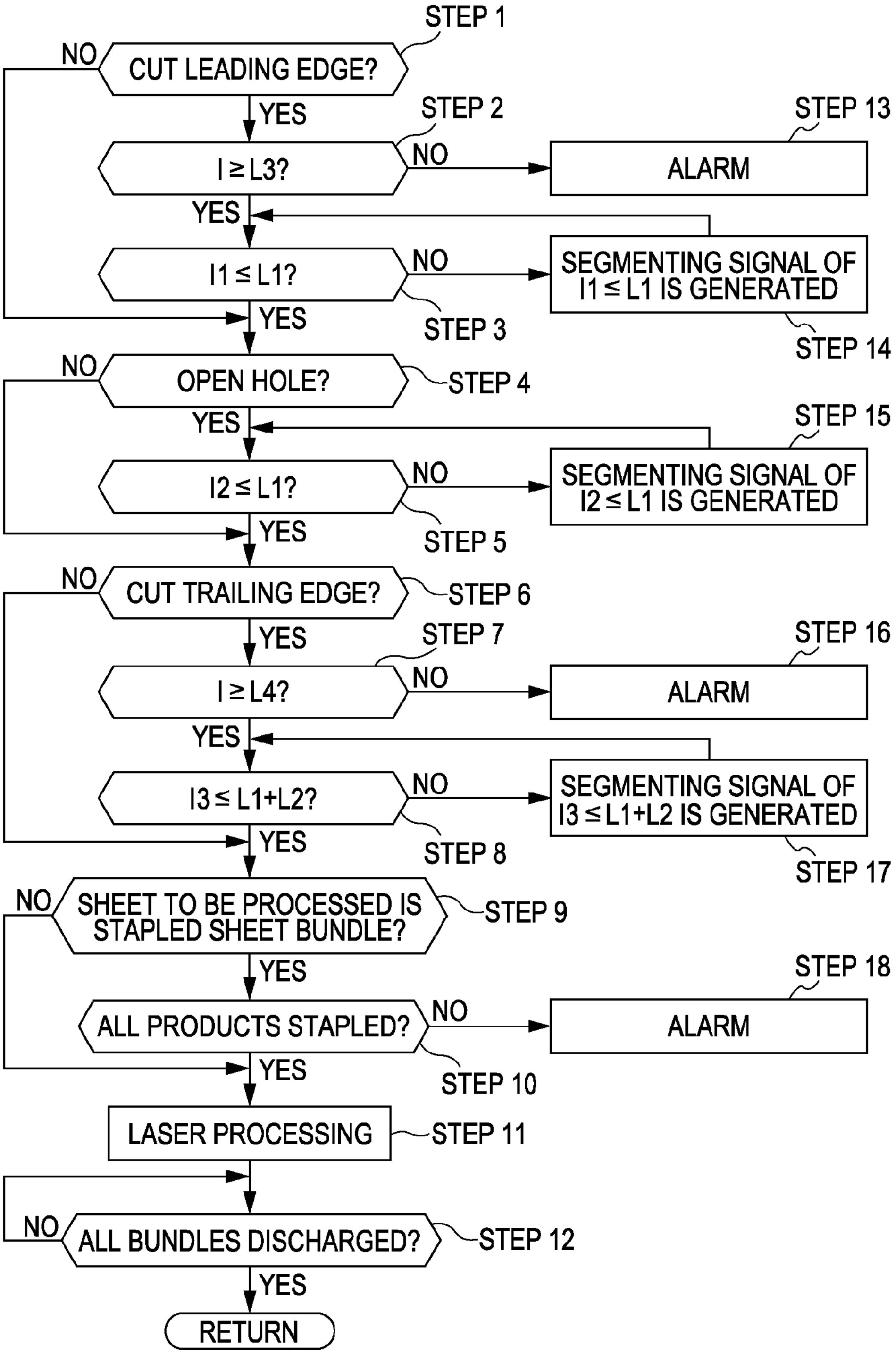
FIG. 8 is a flow chart illustrating the laser processing control of the finisher.

Then, the cutting signal control unit 401 carries out Steps 2 to 8, which are the same as the steps shown in FIG. 8 except that the step of determining whether or not the sheets P to be processed are bound into a sheet bundle PA is not carried out.

According to this embodiment, the laser processing portion 410 is driven in accordance with the length of a sheet P in the conveying direction, the length of a leading edge section of a sheet P to be cut off, and the length of a trailing edge section of a sheet P to be cut off, i.e., in accordance with the cutting positions on a sheet P. In this way, scraps Pd of a cut sheet P can be dropped into the scrap box 413. As a result, the scraps Pd produced when a sheet P is processed can be reliably collected into the scrap box 413 disposed below the laser cutting position.

According to this embodiment, by setting the detection position of the detection sensor 414 configured to detect the accumulated scrap in the scrap box 413 at a predetermined height at a position lower than the processing range of the laser beam in which laser cutting can be carried out, the scraps Pd collected into the scrap box 413 can be prevented from being overheated by a laser beam.

Subsequently, the finisher control unit 501 starts laser processing on the basis of various signals from the cutting signal control unit 401 (Step 11). When all sheet bundles PA are discharged (Y in Step 12), preparation for the next job is carried out.

Figure 12:
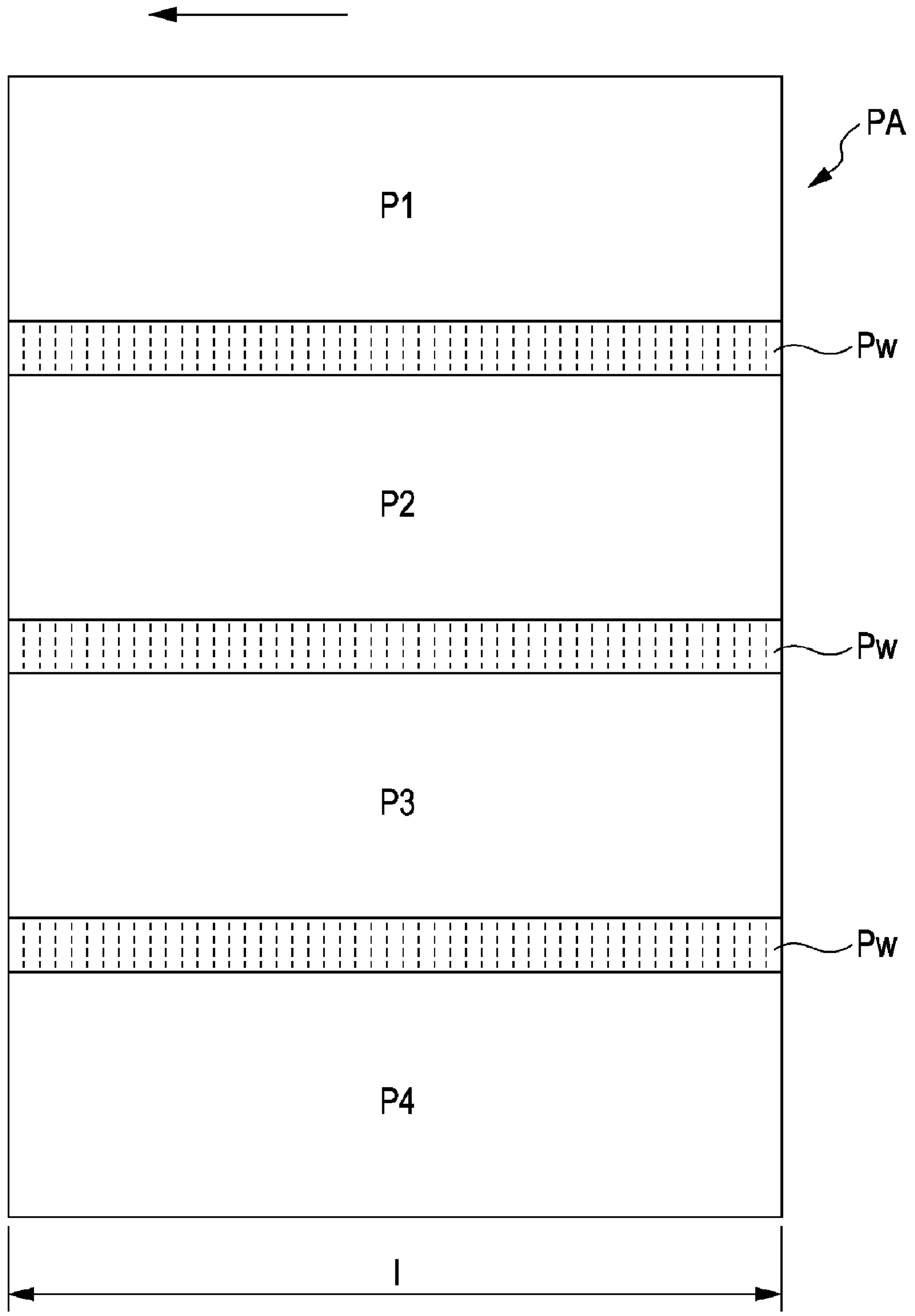
FIG. 12 is a top view illustrating the process of cutting a sheet in the sub scanning direction by the laser processing unit.

According to any of the embodiments described above, a sheet P may be cut along the sub scanning direction, as shown in FIG. 12, at the cutting portion 400. In such a case, too, to reliably convey the products, the conveying rollers 504, 505, 510, and 513 that are disposed downstream of the cutting portion 400 may have continuous conveying surfaces to support the entire area of the products in a direction orthogonal to the conveying direction.

In the above, cutting of a sheet bundle PA bound with staples has been described. However, even when sheets P that are not stapled together are conveyed one by one, the laser cutting operation is the same. In the descriptions above, a known polygon mirror has been used to scan a laser beam in the width direction. However, the laser generator 408 may be scanned by a driving unit provided separately.

In the descriptions above, the bookbinding portion 550 used the staple unit 508 for side-stitch binding. However, bookbinding portion 550 may employ binding methods such as saddle-stitch binding, glue binding, tape binding, or thread-stitch binding.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-159134 filed Jun. 7, 2006, and No. 2007-108410 filed Apr. 17, 2007 which are hereby incorporated by reference herein in their entirety.

What is claimed is:

1. A sheet processing apparatus comprising:

a laser processing unit configured to cut a sheet by irradiating the sheet with a laser beam;

a controller configured to control an operation of the laser processing unit;

a collecting portion provided below a laser processing position of the laser processing unit, the collecting portion being configured to collect a scrap of the sheet produced when the laser processing unit cuts the sheet;

a detecting portion configured to detect the scrap of the sheet reaching a predetermined height in the collecting portion; and a region detecting portion configured to detect the scrap present in a region from the detection position of the detecting portion to the laser processing position, wherein the laser processing unit comprises a scanning portion configured to scan a laser beam, wherein a detection position of the detecting portion is set lower than a processing range of the laser beam irradiated by the laser processing unit, the processing range being a range where cutting by the laser beam is possible, and wherein the controller drives the scanning portion so that an irradiation region of the laser beam matches a sheet conveying region when the scrap is detected by the region detecting portion.

2. The sheet processing apparatus according to claim 1, wherein the controller stops the operation of the laser processing unit responsive to the detecting portion detecting the scrap.

3. The sheet processing apparatus according to claim 2, wherein the controller determines that the accumulated scrap has reached the predetermined height when the scrap continues to be detected by the detecting portion for a predetermined amount of time.

4. The sheet processing apparatus according to claim 1, wherein the detecting portion comprises an optical sensor including a light-emitting portion and a light-detecting portion.

5. The sheet processing apparatus according to claim 4, wherein the light-emitting portion and the light-detecting portion are disposed along the scanning direction of the laser beam so that the detecting portion is capable of detecting the height of the accumulated scrap in a scanning direction of the laser beam scanned by the scanning portion.

6. An image forming apparatus comprising:

an image forming portion configured to form an image on a sheet; and a sheet processing apparatus being configured to cut the sheet on which an image is formed by the image forming portion, the sheet processing apparatus comprising:

a laser processing unit configured to cut a sheet by irradiating the sheet with a laser beam;

a controller configured to control an operation of the laser processing unit;

a collecting portion provided below a laser processing position of the laser processing unit, the collecting portion being configured to collect a scrap of the sheet produced when the laser processing unit cuts the sheet;

a detecting portion configured to detect the scrap of the sheet reaching a predetermined height in the collecting portion; and a region detecting portion configured to detect the scrap present in a region from the detection position of the detecting portion to the laser processing position, wherein the laser processing unit comprises a scanning portion configured to scan a laser beam, wherein a detection position of the detecting portion is set lower than a processing range of the laser beam irradiated by the laser processing unit, the processing range being a range where cutting by the laser beam is possible, and wherein the controller drives the scanning portion so that an irradiation region of the laser beam matches a sheet conveying region when the scrap is detected by the region detecting portion.

7. The image forming apparatus according to claim 6, wherein the detecting portion comprises an optical sensor including a light-emitting portion and a light-detecting portion.

8. The image forming apparatus according to claim 7, wherein the light-emitting portion and the light-detecting portion are disposed along the scanning direction of the laser beam so that the detecting portion is capable of detecting the height of the accumulated scrap in a scanning direction of the laser beam scanned by the scanning portion.

9. The image forming apparatus according to claim 6, wherein the controller stops the operation of the laser processing unit responsive to the detecting portion detecting the scrap.

10. The image forming apparatus according to claim 9, wherein the controller determines that the accumulated scrap has reached the predetermined height when the scrap continues to be detected by the detecting portion for a predetermined amount of time.

* * * * *